United States Patent [19]
Tanamachi et al.

[11] Patent Number: 5,580,478
[45] Date of Patent: Dec. 3, 1996

[54] APPARATUS FOR CONTROLLING THE TEMPERATURE OF AND A MOVEABLE, ELECTRICALLY HEATED OBJECT USING TWO WAY ON AXIS OPTICAL COMMUNICATION

[75] Inventors: Steven W. Tanamachi, Lauderdale, Minn.; Victoria M. Dunlop, St. Croix, Wis.

[73] Assignee: Minnesota Mining and Manufacturing Company, St. Paul, Minn.

[21] Appl. No.: 239,547

[22] Filed: May 9, 1994

[51] Int. Cl.$^6$ ..................................... H05B 1/02
[52] U.S. Cl. .................. 219/502; 219/216; 219/497; 219/505; 340/870.17; 340/870.28; 355/285
[58] Field of Search ..................... 219/216, 388, 219/482, 491, 497, 501, 505, 508, 502; 355/206, 205, 282, 3 FU, 14 FU, 285; 340/870.02, 870.17, 870.03–870.09, 870.28

[56] References Cited

U.S. PATENT DOCUMENTS

| | | | |
|---|---|---|---|
| 3,280,717 | 10/1966 | Bungay | 95/89 |
| 3,515,855 | 6/1970 | Mix, Jr. | 219/388 |
| 3,585,917 | 6/1971 | Griffith | 95/89 |
| 3,696,678 | 10/1972 | Mossey | 73/346 |
| 3,739,143 | 6/1973 | Amundson et al. | 219/216 |
| 3,781,902 | 12/1973 | Shim et al. | 346/24 |
| 3,849,628 | 11/1974 | Abowitz et al. | 219/216 |
| 3,864,709 | 2/1975 | Bruns | 354/297 |
| 4,114,023 | 9/1978 | Zelinka et al. | 219/471 |
| 4,248,095 | 2/1981 | Akatsu et al. | 73/771 |
| 4,540,877 | 9/1985 | Zelinka et al. | 219/497 |
| 4,560,860 | 12/1985 | Fauser | 219/470 |
| 4,585,325 | 4/1986 | Euler | 355/3 FU |
| 4,722,226 | 2/1988 | Edmonds | 73/660 |
| 4,736,090 | 4/1988 | De Broeck et al. | 219/497 |
| 4,994,852 | 2/1991 | Matsuuchi et al. | 355/206 |
| 5,241,159 | 8/1993 | Chatteriee et al. | 219/470 |
| 5,241,349 | 8/1993 | Nagasaka | 355/285 |
| 5,276,756 | 1/1994 | Chambers et al. | 385/90 |
| 5,383,371 | 1/1995 | Laitinen | 73/862.55 |
| 5,402,211 | 3/1995 | Yoshikawa | 355/285 |

*Primary Examiner*—Mark H. Paschall
*Attorney, Agent, or Firm*—Gary L. Griswold; Walter N. Kirn; William D. Bauer

[57] ABSTRACT

Temperature control apparatus for controlling the temperature of an electrically heated moveable object such as an electrically heated rotatable drum. A temperature control mechanism, rotatably mounted in conjunction with the cylindrical drum and electrically coupled to the electrical heater, controls the temperature by controlling the flow of electricity to the electrical heater in response to control signals. A temperature sensor mechanism, rotatably mounted in conjunction with the cylindrical drum and electrically coupled to the temperature sensor, senses the temperature of the surface of the cylindrical drum and produces temperature signals indicative thereof. A microprocessor, non-rotatably mounted with respect to the cylindrical drum, controls the temperature of the electrically heated drum by generating the control signals in response to the temperature signals. An optical mechanism, coupled to the temperature control means, the temperature sensor means and the microprocessor means, optically couples the temperature signals from the rotating temperature sensor means to the non-rotating microprocessor means and optically couples the control signals from the non-rotating microprocessor means to the rotating temperature control means.

60 Claims, 16 Drawing Sheets us 5,580,478

APPARATUS FOR CONTROLLING THE TEMPERATURE OF AND A MOVEABLE, ELECTRICALLY HEATED OBJECT USING TWO WAY ON AXIS OPTICAL COMMUNICATION

TECHNICAL FIELD

The present invention relates generally to apparatus for controlling temperature and, more particularly, to apparatus for controlling the temperature of moveable, electrically heated objects and, preferably, rotatable, electrically heated drums.

BACKGROUND OF THE INVENTION

Photothermography is an established imaging technology. In photothermography, a photosensitive media is exposed to radiation to create a latent image which can then be thermally processed to develop the latent image. Devices and methods for implementing this thermal development process are generally known and include contacting the imaged photosensitive media with a heated platen, drum or belt, blowing heated air onto the media, immersing the media in a heated inert liquid and exposing the media to radiant energy of a wavelength to which the media is not photosensitive, e.g., infrared. Of these conventional techniques, the use of heated drums is particularly common.

A common photosensitive media usable in these imaging processes is known as a photothermographic media, such as film and paper. One photothermographic media has a binder, silver halide, organic salt of silver (or other reducible, light-insensitive silver source), and a reducing agent for the silver ion. In the trade, these photothermographic media are known as dry silver media, including dry silver film.

In order to precisely heat exposed photothermographic media, including film and paper, it has been found to be desirable to use electrically heated drums. In apparatus employing this technique, a cylindrical drum is heated to a temperature near the desired development temperature of the photothermographic media. The photothermographic media is held in close proximity to the heated drum as the drum is rotated about its longitudinal axis. When the temperature of the surface of the heated drum is known, the portion of the circumference around which the photothermographic media is held in close proximity is known and the rate of rotation of the drum is known, the development time and temperature of the photothermographic media can be determined. Generally, these parameters are optimized for the particular photothermographic media utilized and, possibly, for the application in which the photothermographic media is employed.

In order to achieve a high quality-image in the photothermographic media, very precise development parameters must be maintained. Generally, the circumference of the drum over which the photothermographic media travels will not vary significantly. Also, the rate of rotation of the drum, or the transport rate of the photothermographic media through the thermal processor, can be rather precisely maintained. However, it is generally more difficult to control and maintain the temperature of the surface of the drum.

In addition, other factors also contribute to inaccurate processing. The closeness of the proximity which the photothermographic media is held to the drum partially determines the temperature at which the emulsion in the photothermographic media is heated. Further, the presence of foreign particles between the drum and the photothermographic media can interrupt the flow of heat from the drum to the photothermographic media which can affect image quality.

Because many factors affect image quality, one of which is the temperature at which the photothermographic media is developed, the preciseness at which the surface temperature of the drum can be maintained is important to thermal processing of photothermographic media.

The temperature of the drum depends upon many factors. These include the rate at which heat is delivered to the drum, the thermal conductivity and the thermal mass of the drum, the thermal mass of the photothermographic media, the rate, i.e., the number of sheets (if sheet photothermographic media is used) of photothermographic media being processed, the ambient temperature, whether thermal processing is just beginning or whether the thermal processing is in the middle of a long run.

In addition, heated drums are used extensively in various other material processing applications. Examples include calendaring, laminating coating and drying.

Typically, heat is delivered to such drums through the use of electrical resistance heating elements. Since the heated drum is rotating during thermal processing and since it is desirable to deliver electrical power to the electrical resistance during rotation of the drum, it is desirable to be able to deliver electrical power from a stationary power source, e.g., the standard AC line, to the moving, rotating, drum. Electrical power may be delivered to the drum through the use of slip rings coupled to the drum.

In addition, to precisely control the temperature of the electrically heated drum there should be a means to sense the temperature of the drum and a means to control the electrical power applied to the electrical resistance heaters in response to the signal from the temperature sensor.

While temperature control techniques and apparatus are common, the use of such techniques and apparatus on moveable objects or rotating drums is made more difficult by movement of the object or the rotation of the drum.

One solution has been to locate all temperature sensing and control techniques on the moveable object or rotating drum. In the case of a rotating drum, analog temperature control techniques have been used by incorporating a circuit board containing the analog circuitry on or near the rotating drum allowing the circuit board to rotate along with the drum. While this technique minimizes the difficulty of communicating temperature sensing information and control information between the drum and the analog circuitry, it makes it more difficult to interface to the analog control circuitry or to change or adjust the temperature or control algorithm.

A similar technique, employed by Systek, Minneapolis, Minn., utilizes rotating temperature control circuitry and additionally provides a technique for the communication of sensed temperature information from the rotating drum/control circuitry and the communication of adjustment parameters from the user of the thermal processor utilizing the drum to the rotating drum/control circuitry. A ring of a plurality of light emitting diodes are arranged in a generally circular pattern on one end of the drum/control circuitry. A single light emitting diode is positioned on a stationary board near to that one end of the rotating drum/control circuitry. A light sensor is located on the rotating drum/control circuitry on the one end on the axis of rotation. Similarly, a second light sensor is located on the stationary board. Each light sensor is adapted to sense the duty cycle modulated pulse train of the corresponding light emitting diode(s) on the opposite member. Interference in light transmission is minimized by having each pair of light emitting diodes and sensors act at a different frequency. For example, one pair could operate in the visible spectrum and the other pair could operate in the infrared spectrum.

However, the Systek system is limited to the reading of rather coarse temperature sensing information. Further, the entire temperature control loop circuitry is entirely located on the rotating drum/control circuitry board. Thus, any intelligence built into the temperature control loop must be able to be contained on the rotating drum/control circuitry board, limiting the power and options available.

SUMMARY OF THE INVENTION

The present invention provides a temperature controlled heated moveable object and rotatable heated drum and an apparatus for controlling the temperature of a rotatable heated moveable object and heated drum. Very accurate temperature at the surface of the object/drum can be maintained due, in part, to the ability to accurately communicate precisely sensed temperature information from the moveable/rotatable object/drum and to communicate precise control information/signals to the moveable/rotatable object/drum. This allows a portion of the temperature control loop circuitry to be located on a stationary object which, in turn, allows the use of higher power and more sophisticated temperature control techniques and allows cost component sharing with other system operating functions.

In one embodiment, the present invention provides a temperature controlled, electrically heated drum. A cylindrical drum has a surface and is rotatable on an axis. An electrical heater is thermally coupled to the surface of the cylindrical drum. A temperature control mechanism, rotatably mounted in conjunction with the cylindrical drum and electrically coupled to the electrical heater, controls the temperature by controlling the flow of electricity to the electrical heater in response to control signals. A temperature sensor is thermally coupled to the surface of the cylindrical drum. A temperature sensor mechanism, rotatably mounted in conjunction with the cylindrical drum and electrically coupled to the temperature sensor, senses the temperature of the surface of the cylindrical drum and produces temperature signals indicative thereof. A microprocessor, non-rotatably mounted with respect to the cylindrical drum, controls the temperature of the electrically heated drum by generating the control signals in response to the temperature signals. An optical mechanism, coupled to the temperature control means, the temperature sensor means and the microprocessor means, optically couples the temperature signals from the rotating temperature sensor means to the non-rotating microprocessor means and optically couples the control signals from the non-rotating microprocessor means to the rotating temperature control means.

In another embodiment, the present invention provides a temperature control apparatus adapted to control the temperature of a cylindrical drum rotatable on an axis, the cylindrical drum having an electrical heater thermally coupled to the drum, the cylindrical drum having a temperature sensor thermally coupled to the drum. A temperature control mechanism, rotatably mounted in conjunction with the cylindrical drum and electrically coupled to the electrical heater, controls the temperature by controlling the flow of electricity to the electrical heater in response to control signals. A temperature sensor mechanism, rotatably mounted in conjunction with the cylindrical drum and electrically coupled to the temperature sensor, senses the temperature of the surface of the cylindrical drum and produces temperature signals indicative thereof. A microprocessor, non-rotatably mounted with respect to the cylindrical drum, controls the temperature of the electrically heated drum by generating the control signals in response to the temperature signals. An optical mechanism, coupled to the temperature control means, the temperature sensor means and the microprocessor means, optically couples the temperature signals from the rotating temperature sensor means to the non-rotating microprocessor means and optically couples the control signals from the non-rotating microprocessor means to the rotating temperature control means.

In another embodiment, the present invention provides a temperature control apparatus similar to that described above but adapted to control the temperature of a moveable object.

In another embodiment, the present invention provides a temperature control apparatus similar to that described above but with the microprocessor located on the moveable/rotatable temperature control means and wherein the non-movable/non-rotatable portion contains an interface mechanism for communicating temperature sensed or status information from the moveable/rotatable object and for communicating control signals to the moveable/rotatable object.

In another embodiment, the present invention provides a temperature control apparatus similar to that described above but where the optical mechanism has a first optical generating mechanism, non-rotatably mounted on the axis of the cylindrical drum, receiving the microprocessor control signals and generating first optical signals in response thereto. A first optical receiving mechanism, rotatably mounted near the axis of the cylindrical drum, receives the first digitally modulated optical signals and converts the first optical signals to the drum control signals. A second optical generating mechanism, rotatably mounted on the axis of the cylindrical drum, receives the drum temperature signals and generates second optical signals in response thereto. A second optical receiving mechanism, non-rotatably mounted near the axis of the cylindrical drum, receives the second digitally modulated optical signals and converts the second optical signals to the microprocessor temperature signals.

BRIEF DESCRIPTION OF THE DRAWINGS

The foregoing advantages, construction and operation of the present invention will become more readily apparent from the following description and accompanying drawings in which.

DETAILED DESCRIPTION OF THE PREFERRED EMBODIMENTS

Figure 1:
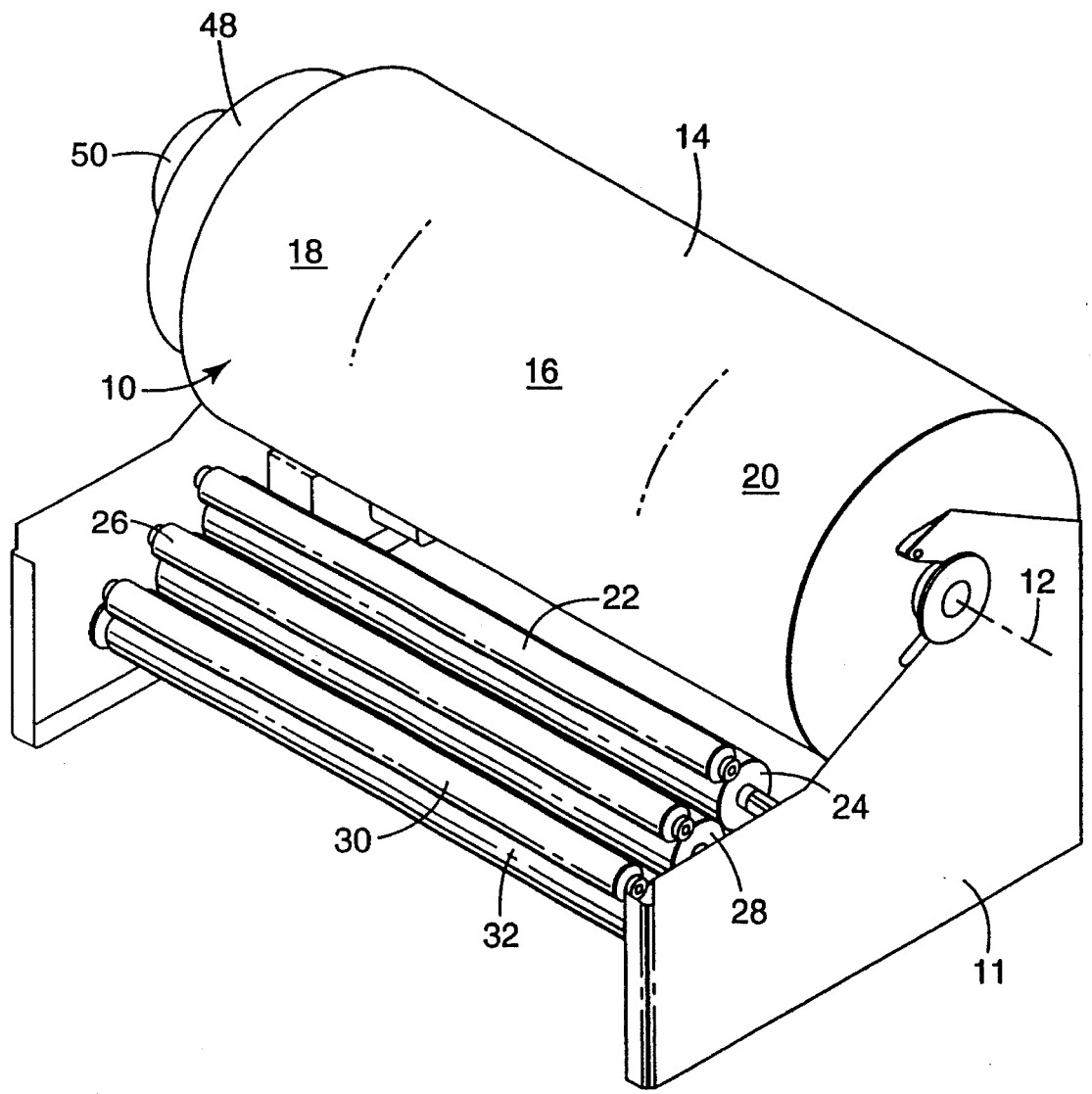
FIG. 1 is an isometric view of a portion of a thermal processor utilizing a rotatable, electrically heated drum.
Figure 2:
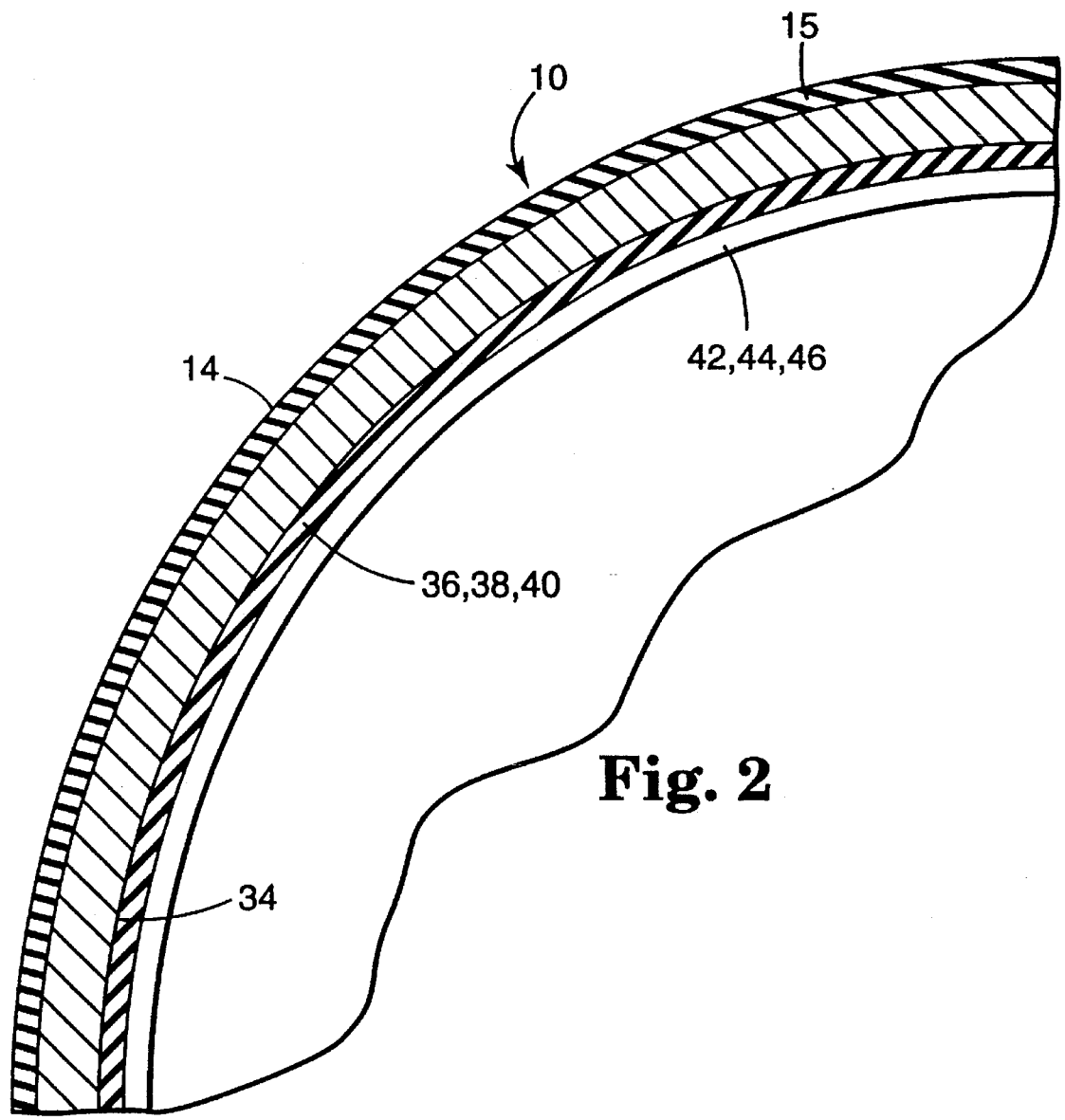
FIG. 2 is a cross-sectional view of the drum shown in FIG. 1.

A portion of a thermal processor utilizing a rotatable electrically heated drum 10 is illustrated in FIGS. 1 and 2. Such a thermal processor may be used by process diagnostic quality dry silver film. Cylindrical drum 10, mounted on frame 11, is rotatable around axis 12. Optionally, exterior surface 14 of drum may be coated with silicone layer 15. Also optionally, exterior surface 14 of drum 10 is divided into zone separately controlled heating zones. Since the edges of surface 14 of drum 10 may cool faster than the central portion of surface 14, a central zone 16 is controlled independently of edge zones 18 and 20. Photothermographic media (not shown) is held in close proximity of exterior surface 14 of drum 10 over a portion of the circumference of drum 10. With a known temperature of exterior surface 14 of drum 10, typically 255 degrees Fahrenheit, a known rotational rate, typically 2.5 revolutions per minute, and a known portion of circumference of surface 14 over which the photothermographic media passes, a known development temperature and dwell time can be achieved. After heated development, cooling rollers (22, 24, 26, 28, 30 and 32) cool the photothermographic media to a temperature below development temperature.

Cylindrical drum is constructed from aluminum having a diameter of 6.25 inches (15.9 centimeters) and with a hollow interior and shell thickness of 0.25 inches (0.635 centimeters). Mounted on the interior surface 34 of drum 10 are electrical resistance heaters 36, 38 and 40 adapted to heat zones 18, 16 and 20, respectively. Exterior surface 14 of drum 10 may have a very delicate coating, so temperature measurement of the drum is done internally in order not to damage the surface coating. Mounted on the interior surface 34 of drum 10 are temperature sensors 42, 44 and 46 adapted to sense the temperature of zones 18, 16 and 20, respectively.

Since drum 10 is rotating, communication to electrical resistance heaters 36, 38 and 40 is done by way of rotating circuit board 48 mounted on one end of cylindrical drum 10 which rotates at the same rate as drum 10. Circuit board 48 is controlled by stationary mounted communications circuit board 50 positioned to optically cooperate with rotating circuit board 48. Communication occurs over an optical communications link.

The temperature of exterior surface 14 is maintained across drum 10 and from sheet to sheet of photothermographic media to within ±0.5 degrees Fahrenheit in order to produce diagnostic quality images.

Figure 3:
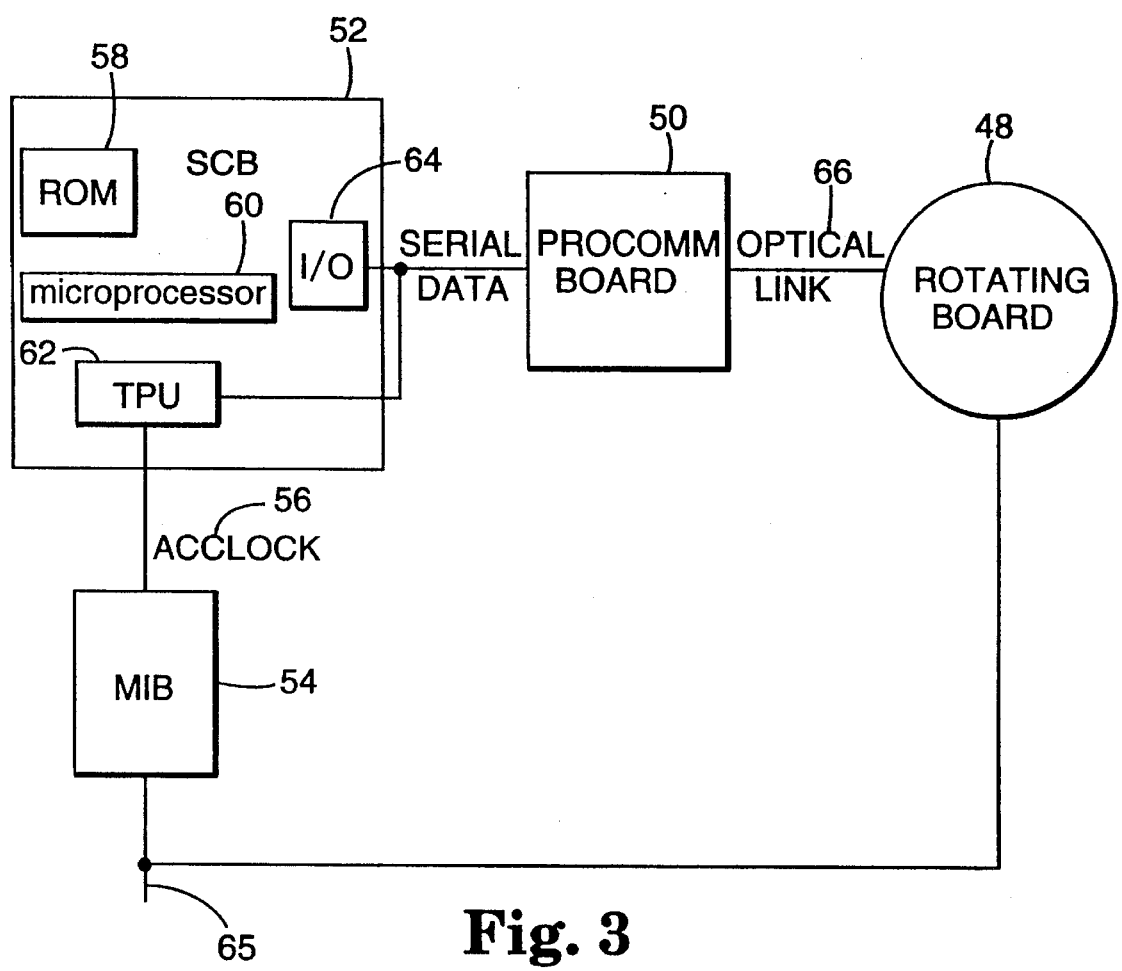
FIG. 3 is a high level block diagram of an electronic temperature control apparatus constructed in accordance with the present invention.

A high level block diagram of the major components of the temperature control circuitry is illustrated in FIG. 3. Rotating circuit board 48 rotates with drum 10 to communicate heater control information to drum 10 and to communicate temperature information to software located on system controller board 52 (stationary). Communications board 50 (stationary) converts serial data from system controller board 52 to optical data to rotating board 48, and vice versa. Machine interface board 54 supplies an ACCLOCK signal 56 which is used to synchronize serial communications between system controller board 52 and rotating board 48. System controller board 52 provides memory 58 in which the temperature control software resides. Microprocessor 60, time processing unit 62 and I/O unit 64 are used by the software to monitor and regulate the temperature of exterior surface 14 of drum 10.

In general, software on system controller board 52 loads heater control data indicating which electrical resistance heaters 36, 38 and 40 to turn on or off into I/O unit 64 to be shifted serially to communications board 50. Communications board 50 converts the data to an optical signal which is sent to rotating board 48 over optical link 66. Rotating board 66 interprets this data into signals which are used to switch power on or off independently to electrical resistance heaters 36, 38 and 40. In response to the heater control data, rotating board 48 reads data from temperature sensors 42, 44 and 46 and sends this data via optical link 66 to communications board 50. Communications board 50, in turn, sends this data to system controller board 52. In system controller board 52, temperature data is read by time processing unit 62. Software can then read this data and convert the temperature data into temperatures and react accordingly to turn electrical resistance heaters 36, 38 and 40 on or off.

Figure 4:
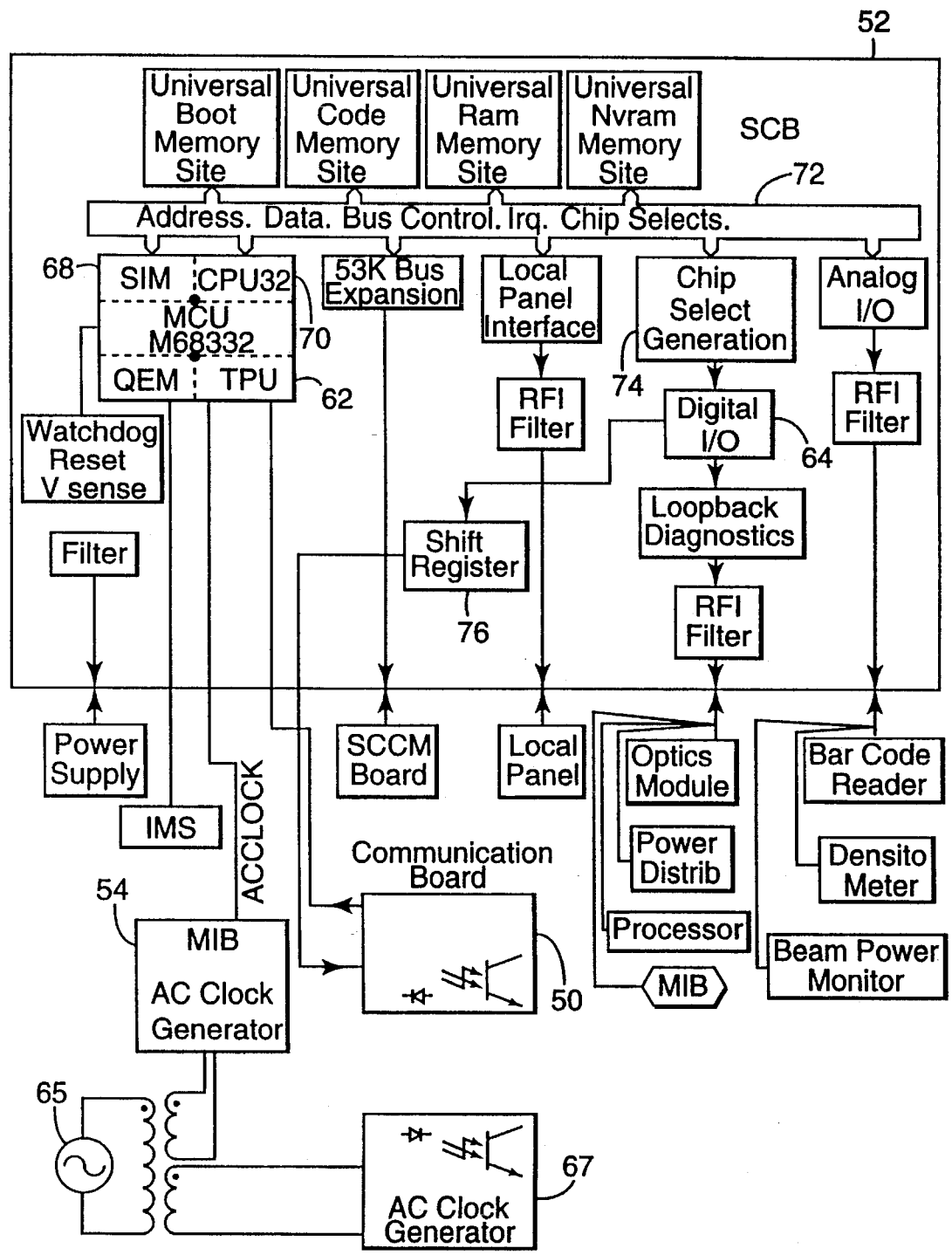
FIG. 4 is a block diagram of a system controller board utilized in the temperature control apparatus of FIG. 3.

System controller board 52, as well as other components, is illustrated in block diagram form in FIG. 4. Machine interface board 54 is adapted to be coupled to an external AC power supply 65. A power isolation transformer supplies a 24 volt ACCLOCK signal to system controller board 52. The external AC power supply is also supplied via solid state relays to power electrical resistance heaters 36, 38 and 40 located on rotating drum 10 through slip rings 67.

Microprocessor 68, a MCU M68332 manufactured by Motorola, contains time processing unit 62 and central processing unit 70. Central processing unit 70 performs instruction processing and supports high-level languages. Time processing unit 62 performs timing tasks and runs independent of central processing unit 70. Time processing unit 62 has 16 channels, one channel is used to capture ACCLOCK signal from machine interface board 54 and one channel is used to capture temperature data from temperature sensors 42, 44 and 46 obtained from communications board 50.

Data from microprocessor 68 can be sent by bus 72 under contol of chip select 74 through digital I/O unit 64 to shift register 76. Chip select 74 generates a signal to cause the data to be routed to shift registers 76. Data from shift register 76 can be serially transmitted to communications board 50 and, ultimately, to rotating board 48 via optical link 66. Data from temperature sensors 42, 44 and 46 is obtained from communications board 50 via optical link 66 and sent directly to time processing unit 62.

Figure 5:
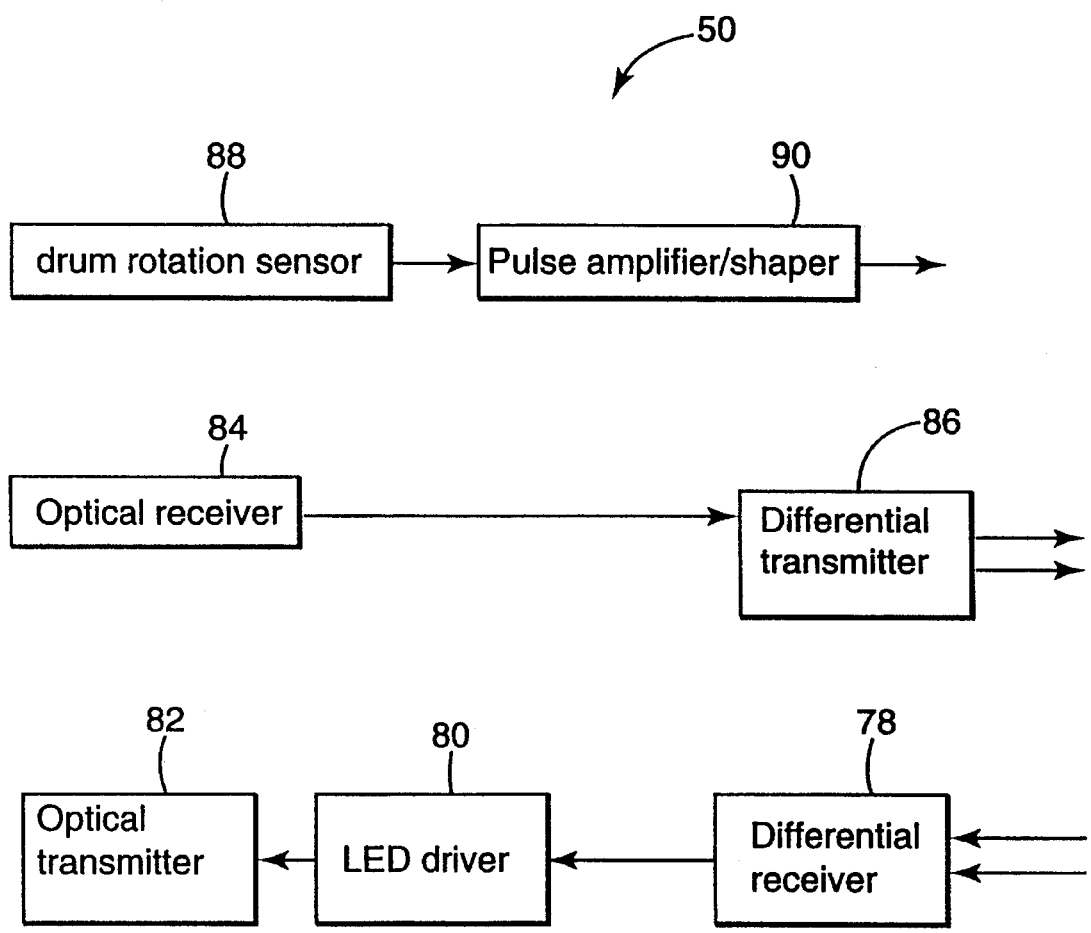
FIG. 5 illustrates a block diagram of communications board utilized in the temperature control apparatus of FIG. 3.

FIG. 5 illustrates a block diagram of communications board 50. Stationary communications board 50 receives control data from system controller board 52 through differential receiver 78 (DS96176) and passes the signals to light emitting diode driver 80 (2N7000) designed to convert signals from system controller board 52 into current pulses in the light emitting diode. Light emitting diode driver 80 is coupled to optical transmitter 82 (MLED81) which emits pulses of infrared light. Light emitting diode driver 80 is mounted on communications board 50 on the rotational axis of drum 10 so it faces round rotating board 48. Optical receiver 84 (MRD750), an infrared photosensor, is mounted next to light emitting diode driver 80 as close as possible to light emitting diode driver 80 and facing rotating board 48. Signals received by optical receiver 84 are transmitted to system controller board 52 through differential transmitter 86 (DS96176). In addition, other components not directly related to the temperature control apparatus are also located on communications board 50. Drum rotation sensor 88 (GP2S15) is connected to pulse amplifier/shaper 90 (LM324) and coupled to system controller board 52 to supply a signal representative of drum 10 rotation.

Figure 6:
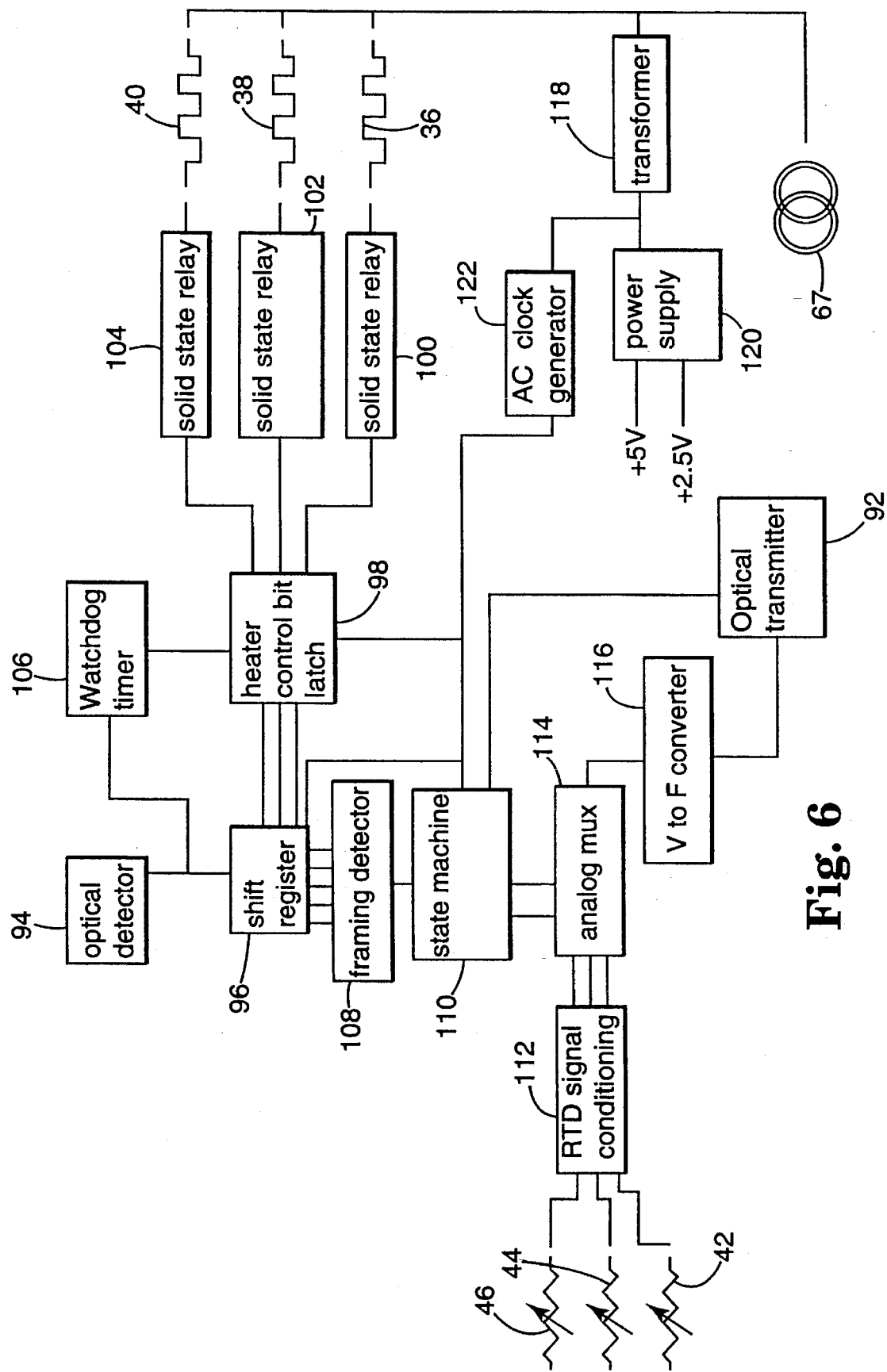
FIG. 6 illustrates a block diagram of rotating board utilized in the temperature control apparatus of FIG. 3.

FIG. 6 illustrates a block diagram of rotating board 48 attached to rotating drum 10. Optical transmitter 92 (7406 and MLED81) is mounted on the rotational axis of drum 10 facing communications board 50. Optical detector 94 (MRD750), an infrared photosensor, is mounted next to optical transmitter 92 as close as possible to optical transmitter 92 and facing communications board 50. All optical transmitters and sensors face each other across the space between communications board 50 and rotating board 48 at a distance of 0.6 inches (1.5 centimeters).

Control signals for electrical resistance heaters 36, 38 and 40 are received via optical link 66 by optical detector 94. The control information is passed to shift register 96 (74HC164) through heater control bit latch 98 (74HC173) to solid state relay 100 (D2W203F) for electrical resistance heater 36, to solid state relay 102 (MOC3033 MAC223) for electrical resistance heater 38 and to solid state relay 104 (D2W203F) for electrical resistance heater 40. Watchdog timer 106 (DS1232) watches an interruption in the receipt of the serial data from optical link 66. Received data is also passed from shift register 96 through framing detector 108 (74HC00,74HC32) to state machine 110 which checks the received serial data for validity and performs control functions. Temperature data is received from temperature sensors 42, 44 and 46 by RTD signal conditioner 112 (LMC660) and passed to an analog multiplexer 114 under control from state machine 110. Provided the synchronization bits in the serial data received by optical detector 94 are correct, state machine 110 then transmits temperature data through V to F converter 116 (AD654) to optical transmitter 92 for transmission across optical link 66 to communications board 50. AC power is received by electrical resistance heaters 36, 38 and 40 through slip rings 67. Transformer 118, power supply 120 (7805 AD680) and AC clock generator 122 (H1 111) provide overhead functions.

Optical transmitters (light emitting diodes) 82 and 92 are of the lens-ended types which allow a beam of light to emerge directed toward the opposing board. These light emitting diodes have a beam dispersion to allow at least 90% beam intensity at 20 degrees off-axis and enough power to reliably trigger the corresponding sensor 94 and 84. This allows a large enough light spot with sufficient intensity at the working distance between the boards to allow slightly off-axis infrared light detection by pulses produced by the opposing board. Thus, a two way optical communications link 66 between rotating board 48 and stationary communications board 50 is established.

A power isolation transformer with dual secondaries is utilized. The 24 volts AC from one of the secondaries is used as the basis of timing of transmission of control bits to communication board 50 and also for low voltage safety interlock functions. The other secondary winding is 120 volts AC and powers the remainder of the temperature control apparatus. This AC voltage is coupled to rotating drum 10 through slip rings 67 and used for electrical resistance heaters 36, 38 and 40 as well as providing a synchronizing signal for the signals to and from rotating board 48. It is desirable to maintain phase coherency between the two clock signals on either side of optical link 66 by careful specification of the transformer winding phasing and AC wiring.

Figure 7:
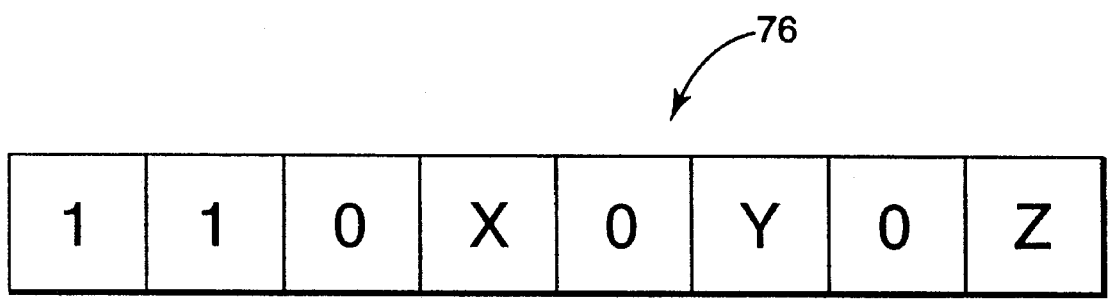
FIG. 7 illustrates the data content of a shift register used to hold serial communication data in the temperature control apparatus of FIG. 3.

FIG. 7 illustrates the content of shift register 76 of system controller board 52. Eight bit shift register 76 can be parallel loaded by software via I/O unit 64. The eight bits contained in shift register 76 represents heater control information. The first "1", "1", "0" pattern is the synchronization pattern to indicate to rotating board 48 that data is being sent. "X" represents a bit indicating whether electrical resistance heater 40 for zone 20 should be turned on or off (a "1" indicates that electrical resistance heater should be turned "on"). Similarly "Y" and "Z" each represent a bit indicating whether electrical resistance heaters 38 and 36 for zones 16 and 18, respectively, should be turned on or off. The two "0" bits between the "X" and "Y" bits and between the "Y" and "Z" bits are also synchronization/validation bits. If zeroes are not contained in these bit locations, rotating board 48, by way of state machine 110, will interpret the data as being invalid and will ignore it.

At the initiation of a shift of this data to communications board 50, data is shifted under the timing control of ACCLOCK signal from machine interface board 54. Before bit time 1, software loads shift register 76 with heater control data. At the falling edge of ACCLOCK signal (bit time 1), software prepares to transmit data. At the next falling edge of ACCLOCK signal (bit time 2), software prepares to initiate transfer of the first bit from shift register 76. At bit time 3, hardware shifts the first bit from shift register 76 (always a "1"). At bit time 4, hardware shifts the next bit from shift register 76 (also always a "1"). At bit time 5, hardware shifts the next bit from shift register 76 (always a "0"). At bit time 6, hardware shifts the next bit from shift register 76 (drum zone 20). At bit time 7, hardware shifts the next bit from shift register 76 (always a "0"). At bit time 8, hardware shifts the next bit from shift register 76 (drum zone 16). At bit time 9, hardware shifts the next bit from shift register 76 (always a "0"). At bit time 10, hardware shifts the next bit from shift register 76 (drum zone 18). At bit times 11 and 12, hardware receives the frequency modulated digital signal representative of the temperature sensed from zone 16. At bit times 13 and 14, hardware receives the frequency modulated digital signal representative of the temperature sensed from zone 20. At bit times 15 and 16, hardware receives the frequency modulated digital signal representative of the temperature sensed from zone 18. At bit times 17 and 18, hardware receives a frequency modulated digital signal indicative of the ambient temperature from rotating board 48.

One ACCLOCK corresponds to one bit time and equals 16 millisecond. Every time a set of signals is sent and received, electrical resistance heaters 36, 38 and 40 may be turned either on or off. Since 18 bit times are required for a complete data cycle, the shortest time a heater can be on is 18 clocks times 16 milliseconds (at 60 Hertz) or 288 milliseconds. Software toggles electrical resistance heaters 36, 38 and 40 on and off at 288 millisecond intervals. Four different duty cycles are used. Over a series of four data communications, each electrical resistance heater may be controlled to either a 0% duty cycle, a 25% duty cycle, a 50% duty cycle, a 75% duty cycle or a 100% duty cycle. The following table illustrates the control conditions for the various duty cycles for each zone.

| Zone | Duty Cycle | Temperature Condition |
|---|---|---|
| 18 & 20 | 0% | Temperature ≥ Temperature Setpoint |
| | 25% | Temperature ≥ Temperature Setpoint − 0.5° F. and Temperature < Temperature Setpoint |
| | 50% | Temperature ≥ Temperature Setpoint − 1.0° F. and Temperature < Temperature Setpoint − 0.5° F. |
| | 75% | Temperature ≥ Temperature Setpoint − 1.5° F. and Temperature < Temperature Setpoint − 1.0° F. |
| | 100% | Temperature < Temperature Setpoint − 1.5° F. |
| 16 | 0% | Temperature ≥ Temperature Setpoint |
| | 25% | Temperature ≥ Temperature Setpoint − 0.25° F. and Temperature < Temperature Setpoint |
| | 50% | Temperature ≥ Temperature Setpoint − 0.5° F. and Temperature < Temperature Setpoint − 0.25° F. |
| | 75% | Temperature ≥ Temperature Setpoint − 0.75° F. and Temperature < Temperature Setpoint − 0.5° F. |
| | 100% | Temperature < Temperature Setpoint − 0.75° F. |

The temperature of internal surface of drum 10 where temperature sensors 42, 44 and 46 are located may be approximately 20 degrees Fahrenheit hotter than exterior surface 14 of drum 10. Each drum zone 16, 18 and 20 is calibrated individually to obtain the best internal drum setpoint that corresponds to the desired surface temperature of drum 10. Once this is done, the information may be stored for later use by the software.

Figure 8:
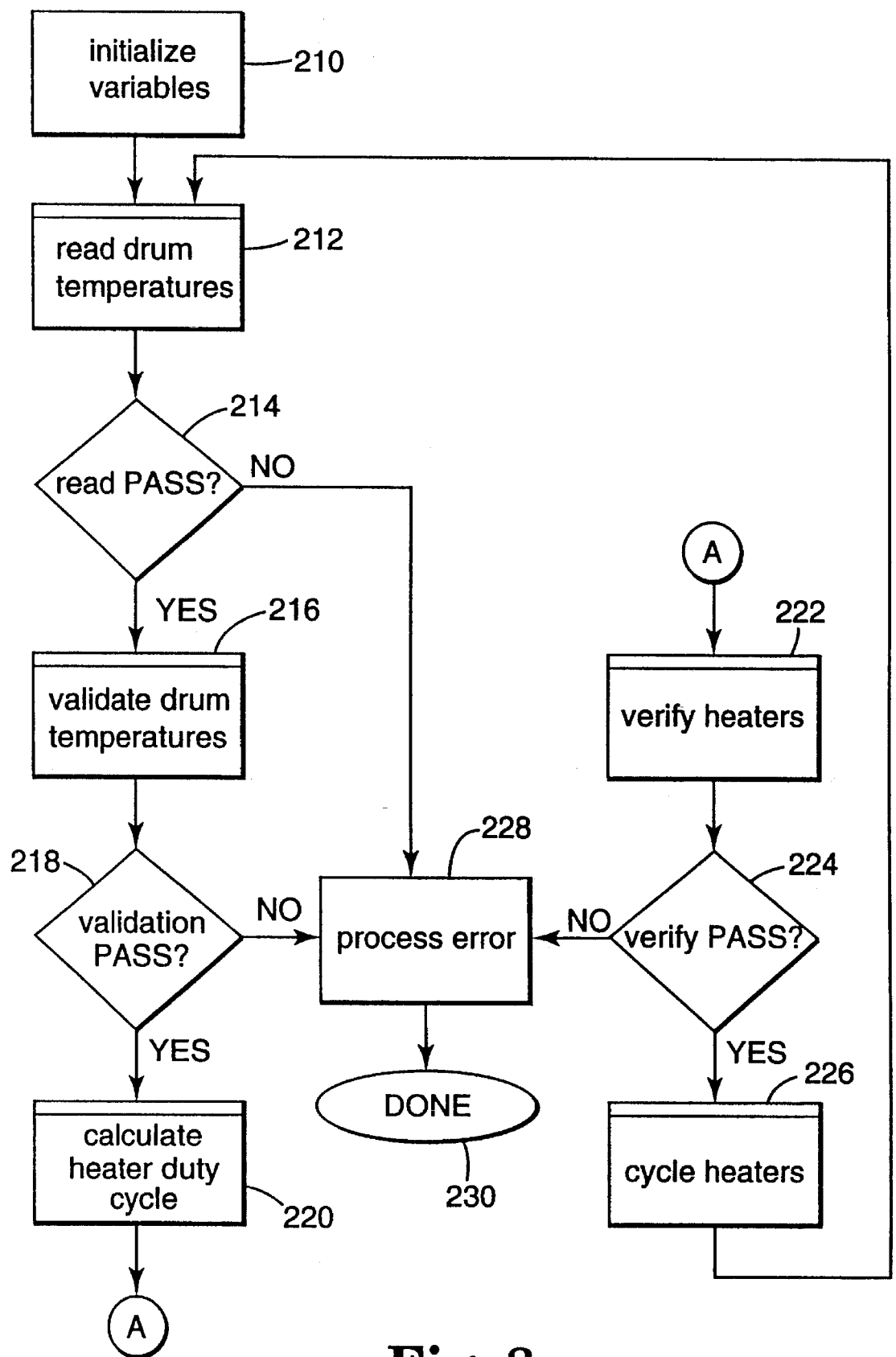
FIG. 8 is a flow chart which illustrates software control of electrical resistance heaters used in the temperature control apparatus of FIG. 3.

FIG. 8 is a flow chart which illustrates software control of electrical resistance heaters 36, 38 and 40. All variables are initialized at block 210. Drum temperatures are read (212). If the read was successful, drum temperatures are validated (216). If drum temperatures are valid (218), the duty cycle of each heater is calculated (220). Then, the operation of the heaters are verified (222). If the heaters pass verification (224), the heaters are cycled (226). If any verification fails, an error (228) is indicated and the process ends (230). Otherwise, continue the temperature control at block 212.

Figure 9:
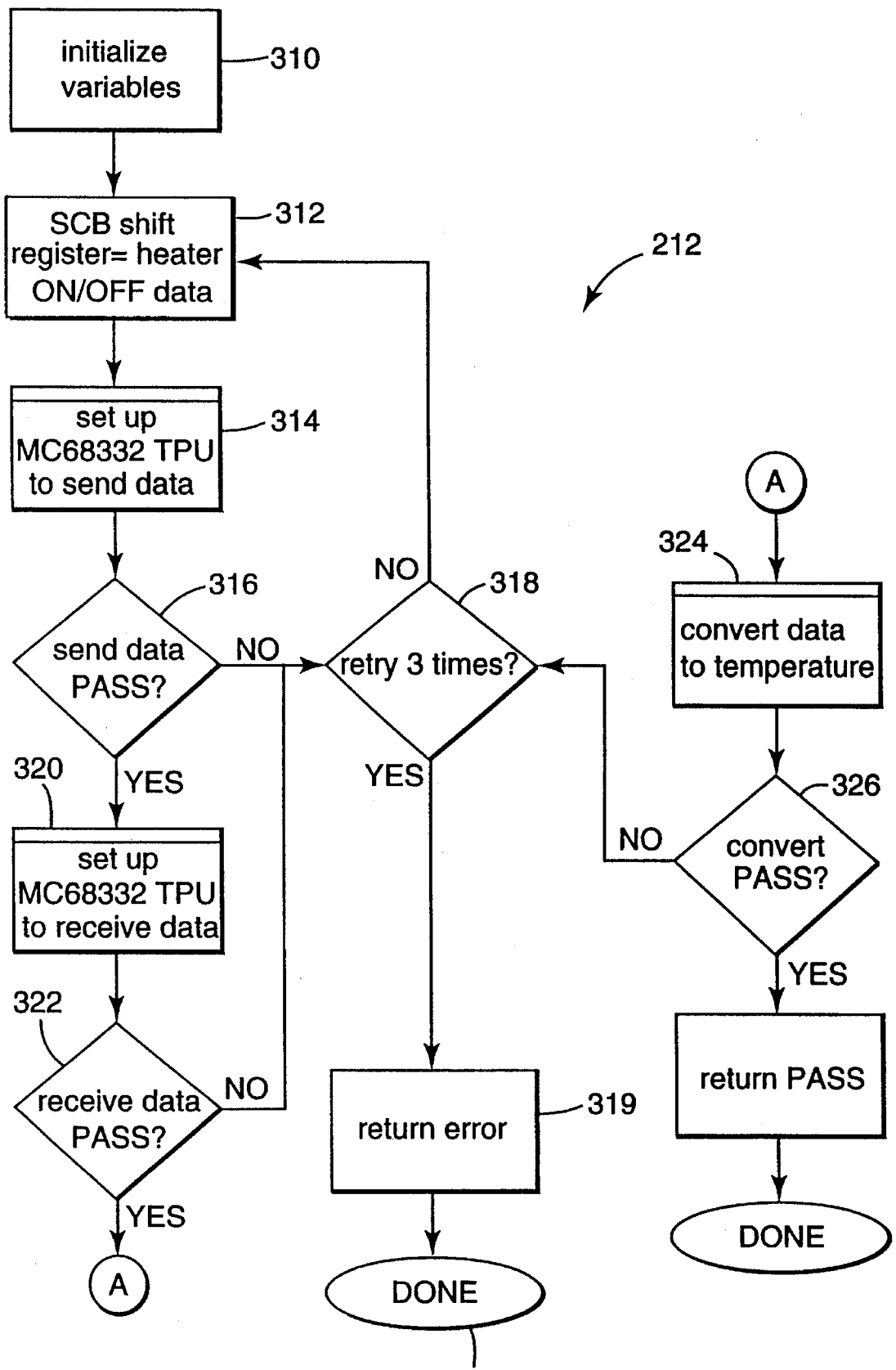
FIG. 9 is a flow chart which illustrates software control of the reading of drum temperatures used in the temperature control apparatus of FIG. 3.

FIG. 9 is a flow chart which illustrates software control of the reading of drum temperatures (212). This process reads the current temperature of each of the three zones of drum 10. Variables are initialized (310). Heater control data is loaded into shift register 76 (312). Time processing 62 is set up to send data (314) from shift register 76. If the data transfer was successful, time processsing unit 62 is set to receive data (320). If data is received properly (322), the temperature frequency data is converted to a temperature (324). If the conversion is successful (326), process control returns to block 212 in FIG. 8. If any data transfer or verification fails three times (316, 318), an error (319) is indicated and the process ends (321).

Figure 10:
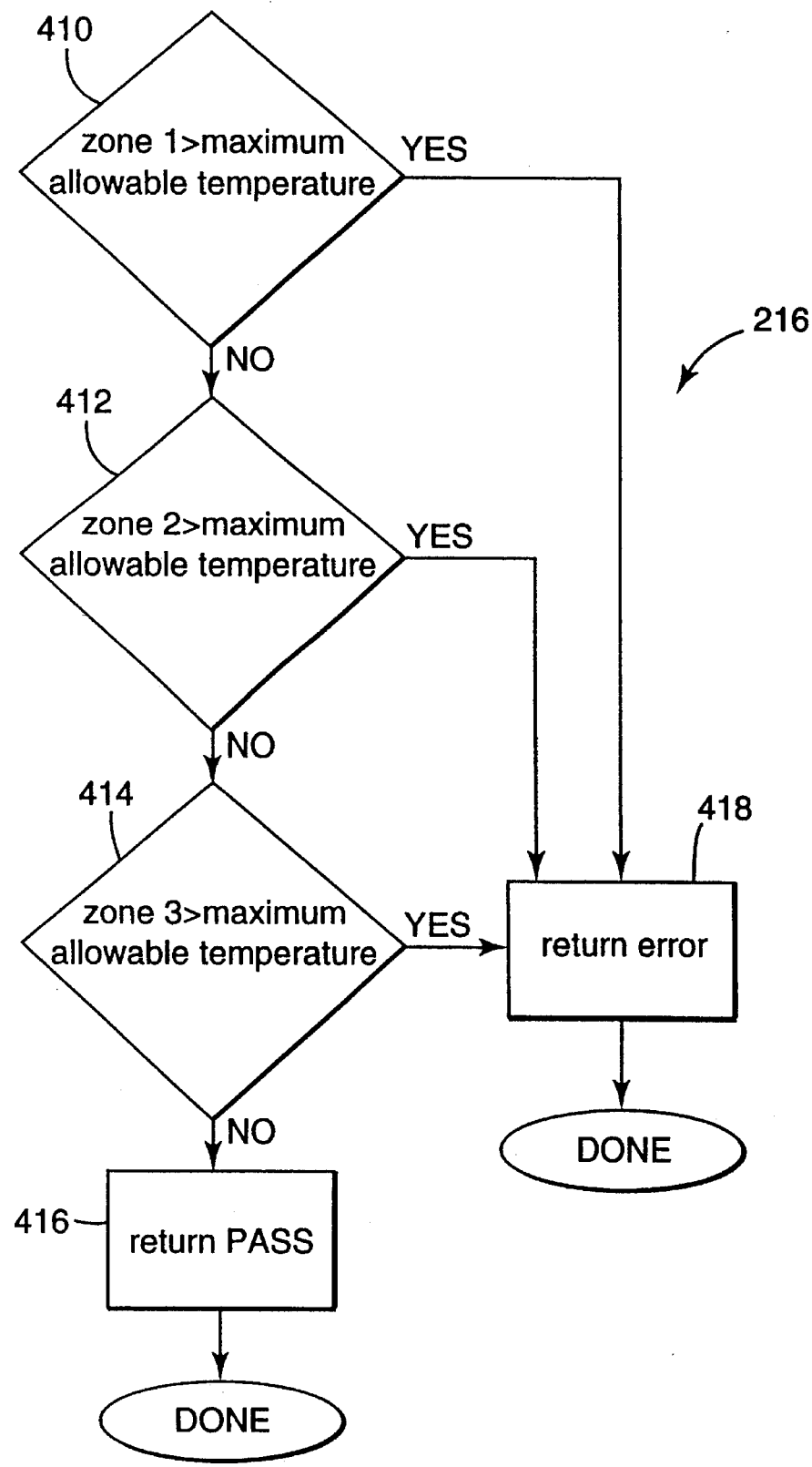
FIG. 10 is a flow chart which illustrates software validation of drum temperatures used in the temperature control apparatus of FIG. 3.

FIG. 10 is a flow chart which illustrates software validation of drum temperatures (216). If the temperature of zone 20 is not above the maximum allowable temperature (410), if the temperature of zone 16 is not above the maximum allowable temperature (412), and if the temperature of zone 18 is not above the maximum allowable temperature (414), the temperatures are valid and control is passed (416) back to block 216. If any maximum is exceeded, a return error is indicated (418).

Figure 11:
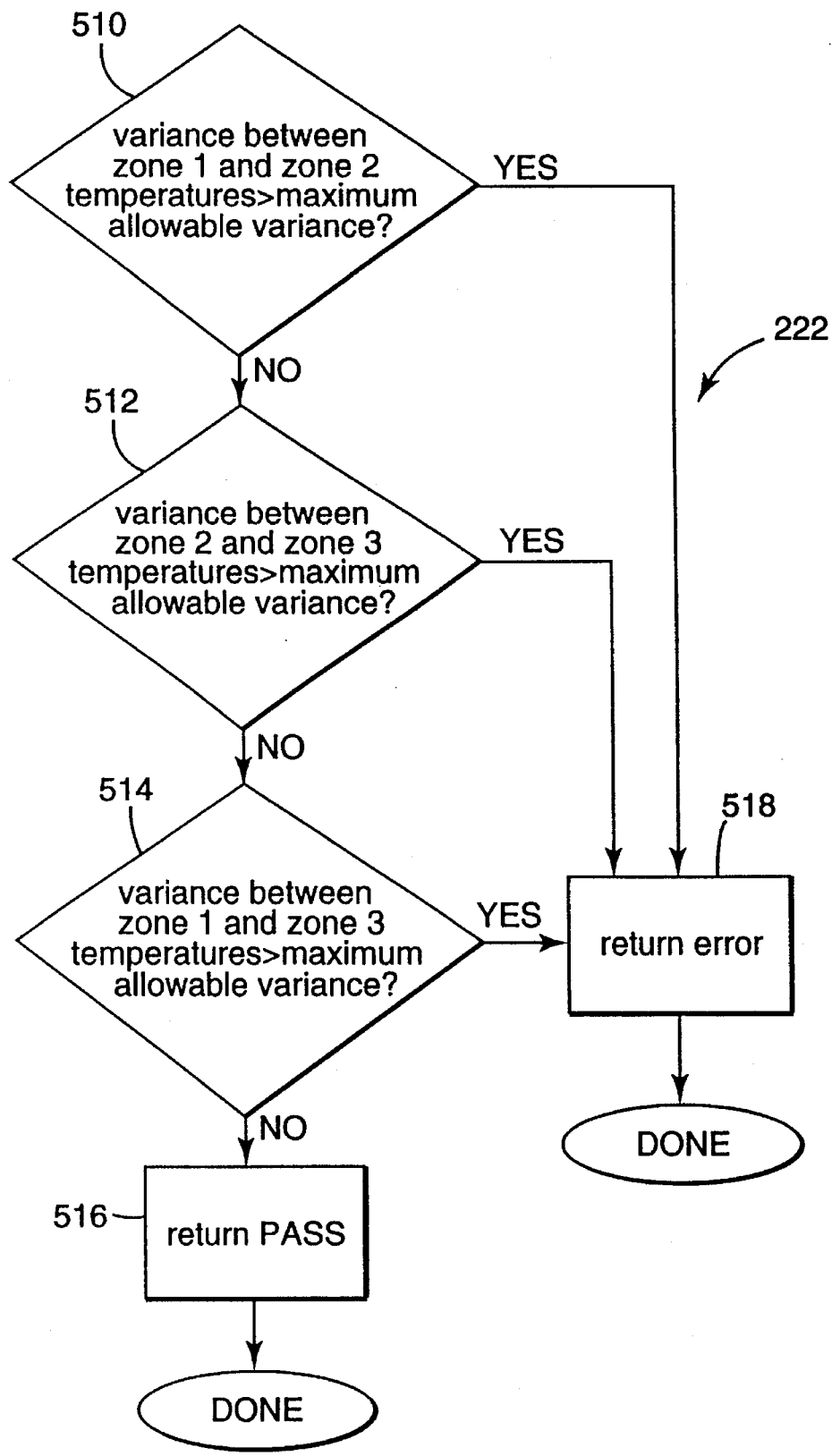
FIG. 11 is a flow chart which illustrates software validation of the heaters used in the temperature control apparatus of FIG. 3.

FIG. 11 is a flow chart which illustrates software validation of the heaters (222). If the variance between zone 20 and zone 16 is not greater than the maximum allowable variance (510), if the variance between zone 16 and zone 18 is not greater than the maximum allowable variance (512), and if the variance between zone 20 and zone 18 is not greater than the maximum allowable variance (514), then the heaters are valid (516) and control is passed back to block 222. If any maximum is exceeded, a return error is indicated (518).

Figure 12A:
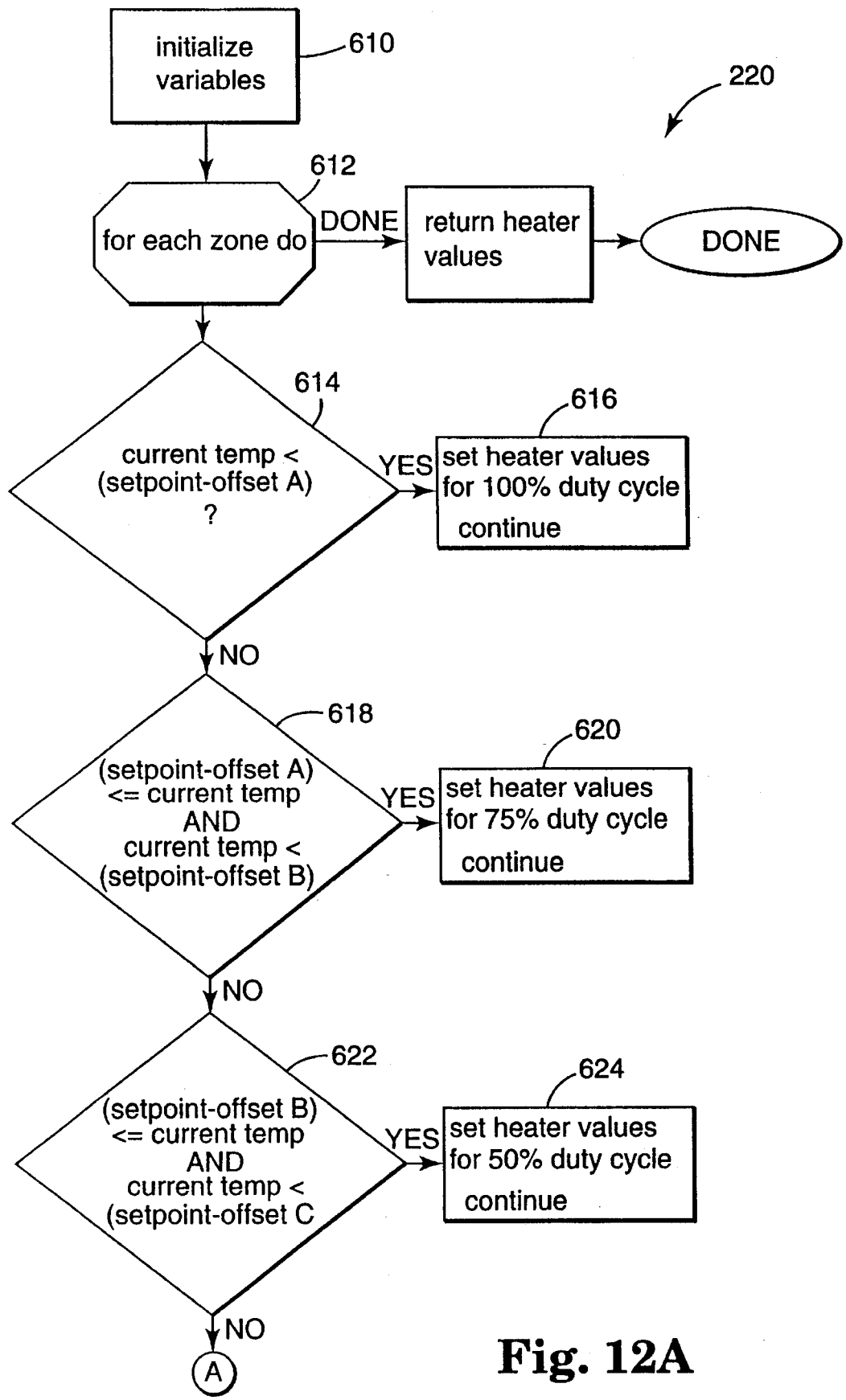
FIGS. 12A and 12B is a flow chart which illustrates software control of calculating heater duty cycles used in the temperature control apparatus of FIG. 3.
Figure 12B:
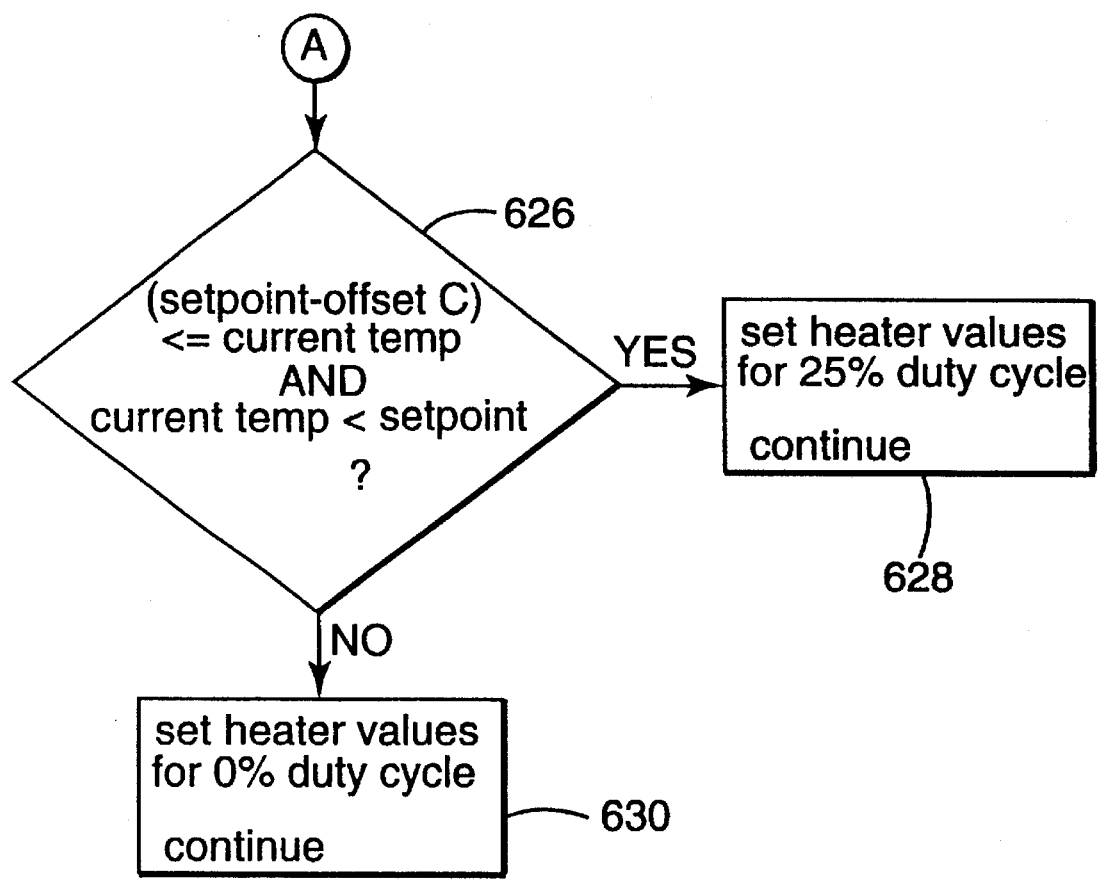

FIGS. 12A and 12B is a flow chart which illustrates software control of calculating heater duty cycles (220). Variables are initialized (610). For each zone (612), do the following. See if the current temperature is less than the predetermined setpoint minus the established offset (614). If yes, set heater value for 100% duty cycle (616). If not, see if the setpoint minus the offset is less than or equal to the current temperature and if the current temperature is less than the setpoint minus a second offset (618). If yes, set heater value for a 75% duty cycle (620). If not, see if the setpoint minus the second offset is less than or equal to the current temperature and if the current temperature is less than the setpoint minus a third offset (622). If yes, set heater value for a 50% duty cycle (624). If not, see if the setpoint minus the third offset is less or equal to the current temperature and if the current temperature is less than the setpoint (626). If yes, set heater value to a 25% duty cycle (628). If not, set heater value to a 0% duty cycle (630). Control is then returned to block 220.

Figure 13:
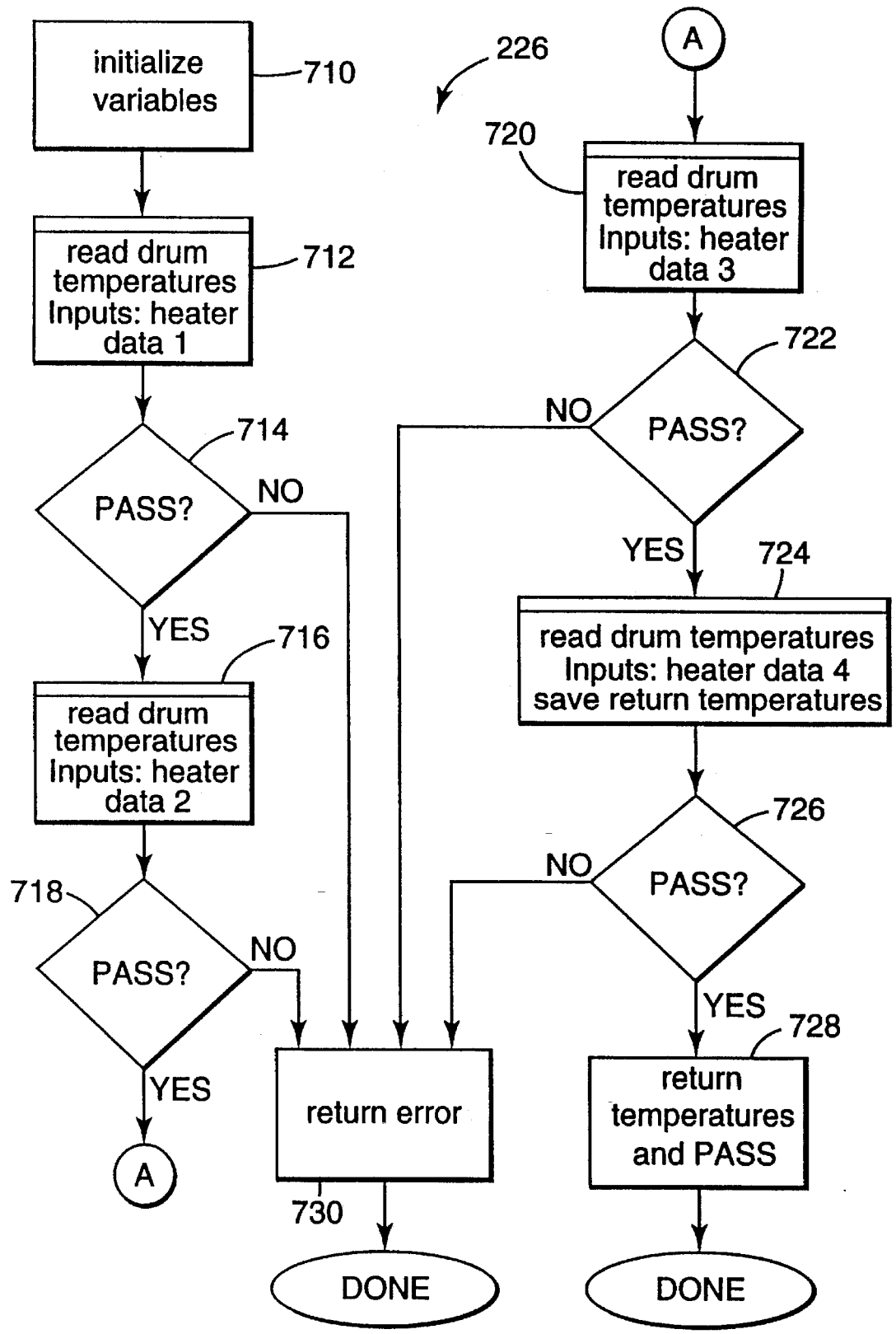
FIG. 13 is a flow chart which illustrates software control of cycling the heaters used in the temperature control apparatus of FIG. 3.

FIG. 13 is a flow chart which illustrates software control of cycling the heaters (226). Variables are initialized (710). Heater data is sent to drum 10 in four bursts. The temperature data is saved from the last burst. Each burst is sent using the read drum temperatures procedure (212). Heater data is sent for the first burst (712). If the information is transferred successfully (714), heater data is sent for the second burst (716). If the information transferred successfully (718), heater data is sent for the third burst (720). If the information transferred successfully (722), heater data is sent for the fourth burst (724). If the information transferred successfully (726), the temperature data is saved (728) and control is then returned to block 226. If a transfer fails at any time, a return error is indicated (730).

Figure 14:
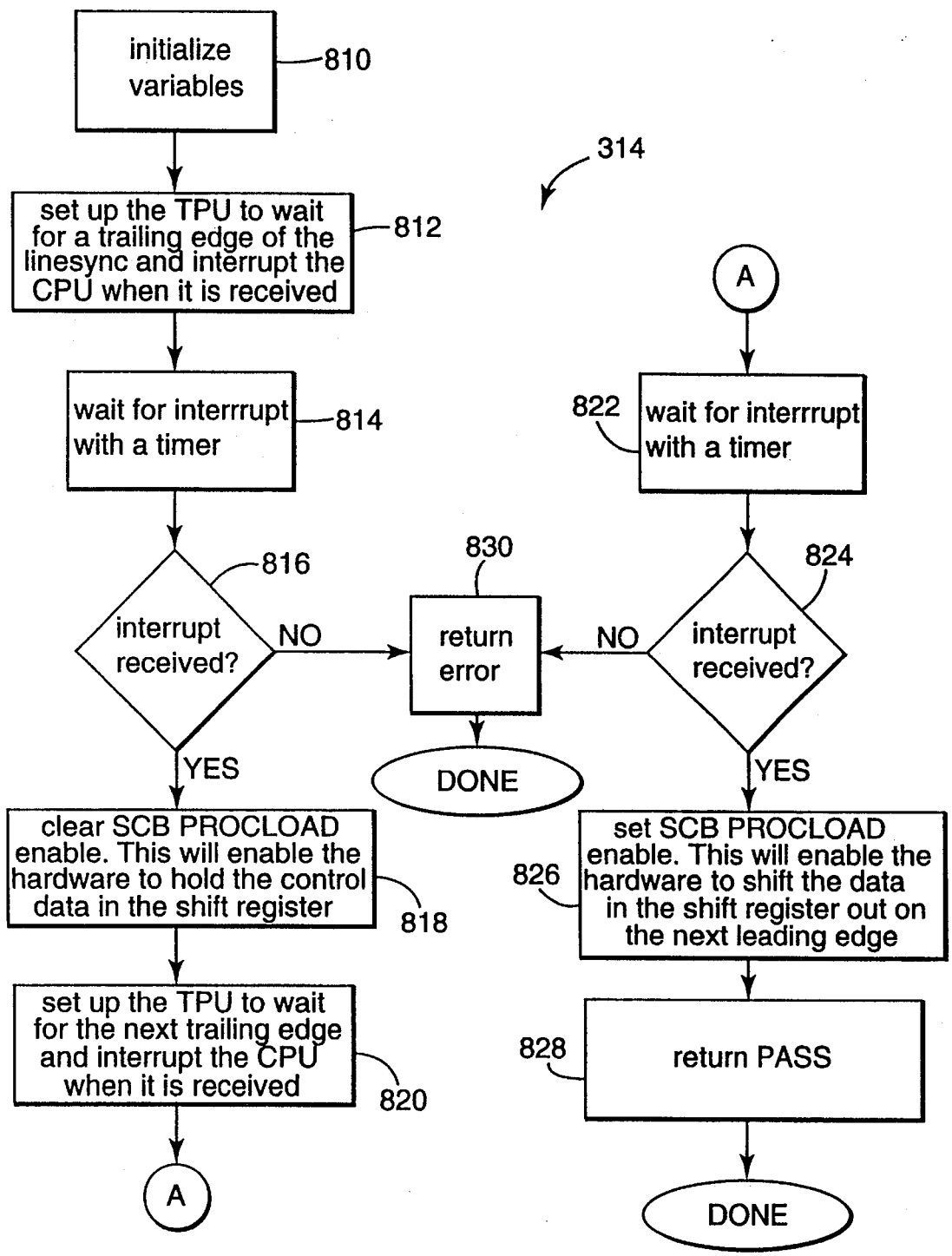
FIG. 14 is a flow chart which illustrates software control of setting up microprocessor to send data used in the temperature control apparatus of FIG. 3.

FIG. 14 is a flow chart which illustrates software control of setting up microprocessor 60 and time processing unit 62 to send data (314). Variables are initialized (810). Time processing unit 62 is set up to wait for a trailing edge of ACCLOCK and will interrupt central processing unit 68 when the trailing edge is received (812). The interrupt is waited for with a timer (814). If the interrupt is received (816), the hardware is alerted to ready the data in shift register 76 (818). Time processing unit 62 is set up to wait for the next trailing edge of ACCLOCK and interrupt central processing unit 68 when the trailing edge is received (820). The interrupt is waited for with a timer (822). If the interrupt is received (824), the hardware is alerted to shift data in shift register 76 out on the next leading edge of ACCLOCK (826). Control is returned to block 314. If no interrupt is received, a return error is indicated (830).

Figure 15:
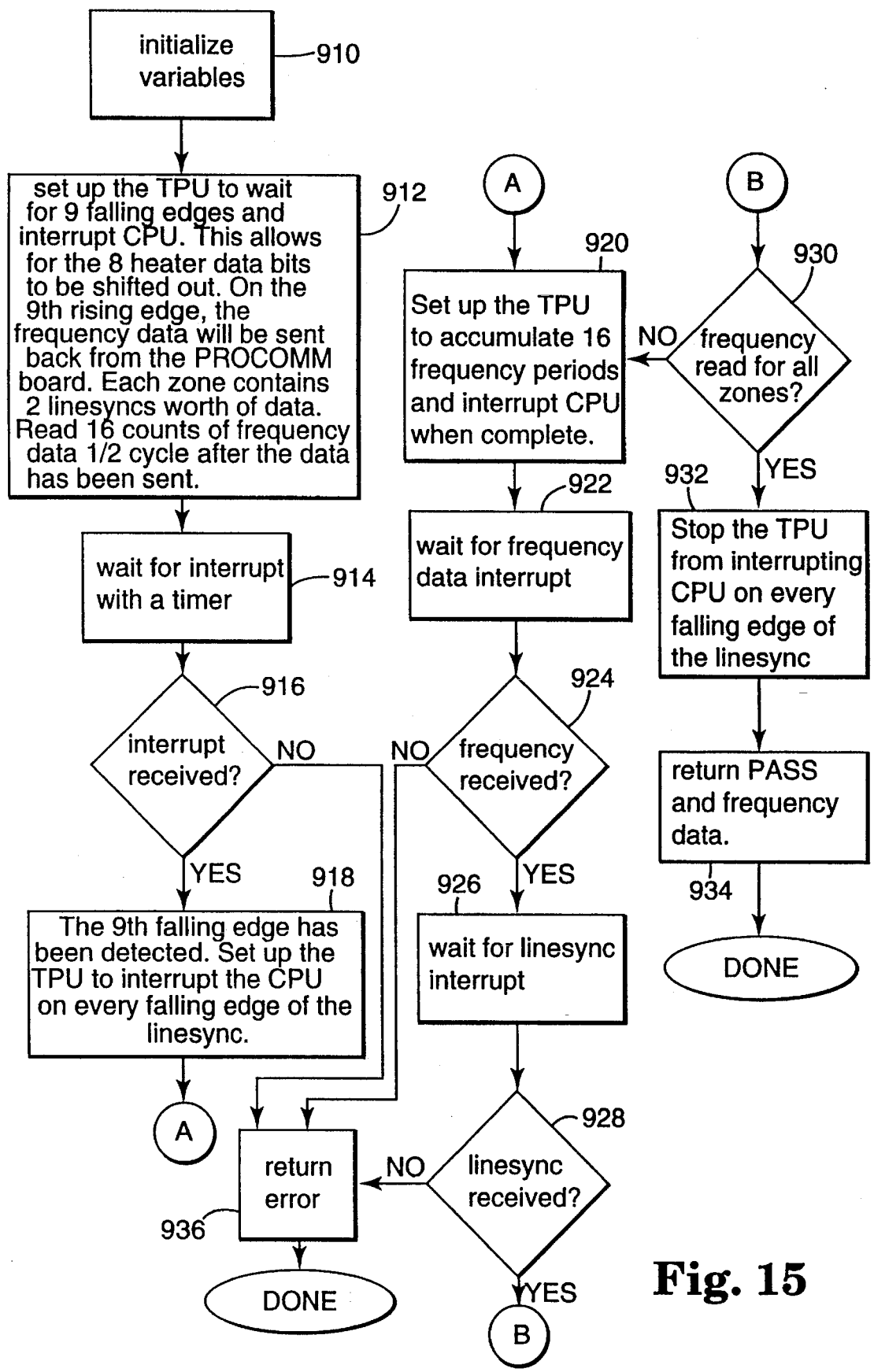
FIG. 15 is a flow chart which illustrates software control of setting up microprocessor to receive data used in the temperature control apparatus of FIG. 3.

FIG. 15 is a flow chart which illustrates software control of setting up microprocessor 60 and time processing unit 62 to receive data (320). Variables are initialized (910). Time processing unit 62 is set up to wait for nine falling edges of ACCLOCK and interrupt central processing unit 68 when the ninth falling edge is received (912). This allows for the eight heater data bits to be shifted out. On the ninth rising edge, the frequency data will be sent back from communications board 50. Each zone contains two linesyncs worth of data. Sixteen counts of frequency data should be read one half cycle after the data has been sent. Wait for the interrupt from the ninth falling edge (914). If the interrupt is received (916), the ninth falling edge of ACCLOCK has been detected and one channel of time processing unit 62 is set up to interrupt central processing unit 68 on every falling edge of ACCLOCK (918). Then, a second channel on time processing unit 62 is set up to accumulate 16 frequency periods and to interrupt central processing unit 68 when complete (920). A wait is made for the second channel to interrupt (922). If the frequency is received (924), a wait is made for the first channel to interrupt (linesync, ACCLOCK) (926). If the linesync is received (928), and if frequency has been read for all three zones (930), time processing unit is stopped from interrupting central processing unit 68 on every falling edge of ACCLOCK (932). If frequency data for all three zones has not been read (930), control is returned to block 920 to continue reading frequency data for another zone. If the expected interrupts, linesyncs and frequency data is not received, a return error is indicated (936). Control is returned to block 320.

To convert frequency information to a temperature, several factors are known. The frequency of clock is 240 nanoseconds. The inverse of the frequency equals the number clock counts. Frequency corresponds linearly to temperature in degrees Fahrenheit in that 300 degrees Fahrenheit equals 1.4257 kilohertz and 70 degrees Fahrenheit equals 10.521 kilohertz. Using the point slope formula with two equations and two unknowns, the temperature in degrees Fahrenheit equals 336.0366—(1053188.3333/number of clock counts).

While the preferred embodiment has been described in relation to a thermal processor having a rotatable heated drum, the temperature control apparatus has usefulness in other applications involving moveable objects requiring precise temperature control.

In another embodiment, the optical path from stationary communications board 50 to rotating board 48 is on the rotational axis of rotatable drum 10. That is, light emitting diode mounted on stationary communications board 50 is positioned on the rotational axis of drum 10 and photosensor mounted on rotating board 48 is also positioned on the rotational axis of drum 10. The optical path from rotating board 48 to stationary communications board 50 is off-axis. A light emitting diode is mounted on rotating board 48 at a position off of the rotational axis of drum 10 facing communications board 50. A photosensor is mounted on stationary communications board 50, also off the rotational axis of drum 10, but in a position where it would intercept the optical transmission of the light emitting diode mounted on rotating board 48 at least once every rotation of drum 10. Thus, this light emitting diode and photosensor could be used as an index to determine the rotational position of drum 10. Communication from rotating board 48 to communications board 50 could occur for a period of time during each revolution since the optical path would be in alignment for a period time until rotation of drum 10 would cause the optical path to be broken. The rotational position information for drum 10 could also be used be locate a particular feature on drum 10, e.g., a portion to be avoided such as a seam or a defect.

Thus, it can be seen that there has been shown and described a novel apparatus for controlling the temperature of and a moveable, electrically heated object. It is to be recognized and understood, however, that various changes, modifications and substitutions in the form and the details of the present invention may be made by those skilled in the art without departing from the scope of the invention as defined by the following claims.

What is claimed is:

1. A temperature controlled, electrically heated drum, comprising:

a cylindrical drum having a surface and being rotatable on an axis;

an electrical heater thermally coupled to said surface of said cylindrical drum;

temperature control means, rotatably mounted in conjunction with said cylindrical drum and electrically coupled to said electrical heater, for controlling the temperature by controlling the flow of electricity to said electrical heater in response to control signals;

a temperature sensor thermally coupled to said surface of said cylindrical drum;

temperature sensor means, rotatably mounted in conjunction with said cylindrical drum and electrically coupled to said temperature sensor, for sensing the temperature of said surface of said cylindrical drum and producing temperature signals indicative thereof;

microprocessor means, non-rotatably mounted with respect to said cylindrical drum, for controlling said temperature of said electrically heated drum by generating said control signals in response to said temperature signals; and optical means, coupled to said temperature control means, said temperature sensor means and said microprocessor means, for continuously aligning and optically coupling said temperature signals from said rotating temperature sensor means to said non-rotating microprocessor means and for continuously optically coupling said control signals from said non-rotating microprocessor means to said rotating temperature control means;

said optical means being mounted on said axis providing on-axis optical communication.

2. A temperature control apparatus as in claim 1 wherein said electrical heaters are adapted to be electro-mechanically coupled to a non-rotatable external power supply.

3. A temperature control apparatus as in claim 2 wherein said first and second optical generating means and said first and second optical receiving means are synchronized through the use of a common synchronization signal.

4. A temperature control apparatus as in claim 3 wherein said common synchronization signal is derived from said external power supply.

5. A temperature control apparatus as in claim 4 wherein said first optical signals comprise a series of synchronization bits followed by a combination of data bits and further synchronization bits.

6. A temperature control apparatus as in claim 5 wherein said second optical signals are frequency modulated to be indicative of said temperature of said cylindrical drum.

7. A temperature controlled, electrically heated drum, comprising:

a cylindrical drum rotatable on an axis, said drum having an outer surface divided into a plurality of zones arranged longitudinally along said axis of said drum;

a plurality of electrical heaters, one for each of said plurality of zones, thermally coupled to each of said plurality of zones, respectively;

temperature control means, rotatably mounted in conjunction with said cylindrical drum and electrically coupled to said plurality of electrical heaters, for controlling the temperature by controlling the flow of electricity to said electrical heaters in response to control signals;

a plurality of temperature sensors, one for each of said plurality of zones, thermally coupled to each of said plurality of zones, respectively;

temperature sensor means, rotatably mounted in conjunction with said cylindrical drum and electrically coupled to said plurality of temperature sensors, for sensing the temperature of each of said plurality of zones of said surface of said cylindrical drum and producing temperature signals indicative thereof;

microprocessor means, non-rotatably mounted with respect to said cylindrical drum, for controlling said temperature of said electrically heated drum by generating said control signals in response to said temperature signals; and optical means, coupled to said temperature control means, said temperature sensor means and said microprocessor means, for continuously aligning and optically coupling said temperature signals from said rotating temperature sensor means to said non-rotating microprocessor means and for continuously optically coupling said control signals from said non-rotating microprocessor means to said rotating temperature control means;

said optical means being mounted on said axis providing on-axis optical communication.

8. A temperature control apparatus as in claim 17 wherein said electrical heaters are adapted to be electro-mechanically coupled to a non-rotatable external power supply.

9. A temperature control apparatus as in claim 8 wherein said first and second optical generating means and said first and second optical receiving means are synchronized through the use of a common synchronization signal.

10. A temperature control apparatus as in claim 9 wherein said common synchronization signal is derived from said external power supply.

11. A temperature control apparatus as in claim 7 wherein said first optical signals comprise and series of synchronization bits followed by a combination of data bits and further synchronization bits.

12. A temperature control apparatus as in claim 11 wherein said second optical signals are frequency modulated to be indicative of said temperature of said cylindrical drum.

13. A temperature control apparatus adapted to control the temperature of a cylindrical drum rotatable on an axis, said drum having an outer surface divided into a plurality of zones arranged longitudinally along said axis, said cylindrical drum having a plurality of electrical heaters, one for each of said plurality of zones, thermally coupled to each of said plurality of zones, said cylindrical drum having a plurality of temperature sensors, one for each of said plurality of zones, thermally coupled to each of said plurality of zones, respectively, said temperature control apparatus comprising:

temperature control means, rotatably mounted in conjunction with said cylindrical drum and electrically coupled to said plurality of electrical heaters, for controlling the temperature by controlling the flow of electricity to said electrical heaters in response to control signals;

temperature sensor means, rotatably mounted in conjunction with said cylindrical drum and electrically coupled to said plurality of temperature sensors, for sensing the temperature of each of said plurality of zones of said surface of said cylindrical drum and producing temperature signals indicative thereof;

microprocessor means, non-rotatably mounted with respect to said cylindrical drum, for controlling said temperature of said electrically heated drum by generating said control signals in response to said temperature signals; and optical means, coupled to said temperature control means, said temperature sensor means and said microprocessor means, for continuously aligning and optically coupling said temperature signals from said rotating temperature sensor means to said non-rotating microprocessor means and for continuously optically coupling said control signals from said non-rotating microprocessor means to said rotating temperature control means;

said optical means being mounted on said axis providing on-axis optical communication.

14. A temperature control apparatus as in claim 13 wherein said electrical heaters are adapted to be electro-mechanically coupled to a non-rotatable external power supply.

15. A temperature control apparatus as in claim 14 wherein said first and second optical generating means and said first and second optical receiving means are synchronized through the use of a common synchronization signal.

16. A temperature control apparatus as in claim 15 wherein said common synchronization signal is derived from said external power supply.

17. A temperature control apparatus as in claim 16 wherein said first optical signals comprise and series of synchronization bits followed by a combination of data bits and further synchronization bits.

18. A temperature control apparatus as in claim 17 wherein said second optical signals are frequency modulated to be indicative of said temperature of said cylindrical drum.

19. A temperature control apparatus adapted to control the temperature of a movable object, said object having an electrical heater thermally coupled to said object and having a plurality of temperature sensors thermally coupled to said object, said temperature control apparatus comprising:

temperature control means, movably mounted in conjunction with said object and electrically coupled to said electrical heater, for controlling the temperature of said object by controlling the flow of electricity to said electrical heater in response to a control signal;

temperature sensor means, movably mounted in conjunction with said object and electrically coupled to said temperature sensor, for sensing the temperature of said object and producing a temperature signal indicative thereof;

microprocessor means, stationary with respect to said object, for controlling said temperature of said object by generating said control signal in response to said temperature signal; and optical means, coupled to said temperature control means, said temperature sensor means and said microprocessor means, for continuously aligning and optically coupling said temperature signals from said movable temperature sensor means to said stationary microprocessor means and for continuously optically coupling said control signal from said stationary microprocessor means to said movable temperature control means;

said optical means being mounted on said axis providing on-axis optical communication.

20. A temperature control apparatus as in claim 19 wherein said electrical heaters are adapted to be electromechanically coupled to a non-rotatable external power supply.

21. A temperature control apparatus as in claim 20 wherein said first and second optical generating means and said first and second optical receiving means are synchronized through the use of a common synchronization signal.

22. A temperature control apparatus as in claim 21 wherein said common synchronization signal is derived from said external power supply.

23. A temperature control apparatus as in claim 22 wherein said first optical signals comprise and series of synchronization bits followed by a combination of data bits and further synchronization bits.

24. A temperature control apparatus as in claim 23 wherein said second optical signals are frequency modulated to be indicative of said temperature of said cylindrical drum.

25. A temperature control apparatus adapted to control the temperature of a cylindrical drum rotatable on an axis, said drum having an outer surface divided into a plurality of zones arranged longitudinally along said axis, said cylindrical drum having a plurality of electrical heaters, one for each of said plurality of zones, thermally coupled to each of said plurality of zones, said cylindrical drum having a plurality of temperature sensors, one for each of said plurality of zones, thermally coupled to each of said plurality of zones, respectively, said temperature control apparatus comprising:

temperature control means, rotatably mounted in conjunction with said cylindrical drum and electrically coupled to said plurality of electrical heaters, for controlling the temperature by controlling the flow of electricity to said electrical heaters in response to drum control signals;

temperature sensor means, rotatably mounted in conjunction with said cylindrical drum and electrically coupled to said plurality of temperature sensors, for sensing the temperature of each of said plurality of zones of said surface of said cylindrical drum and producing drum temperature signals indicative thereof;

microprocessor means, non-rotatably mounted with respect to said cylindrical drum, for controlling said temperature of said electrically heated drum by generating said microprocessor control signals in response to microprocessor temperature signals; and first optical generating means, non-rotatably mounted on said axis of said cylindrical drum, for receiving said microprocessor control signals and generating first optical signals in response thereto;

first optical receiving means, rotatably mounted near said axis of said cylindrical drum, for continuously receiving said first digitally modulated optical signals and converting said first optical signals to said drum control signals;

second optical generating means, rotatably mounted on said axis of said cylindrical drum, for receiving said drum temperature signals and generating second optical signals in response thereto;

second optical receiving means, non-rotatably mounted near said axis of said cylindrical drum, for continuously receiving said second digitally modulated optical signals and converting said second optical signals to said microprocessor temperature signals.

26. A temperature control apparatus as in claim 25 wherein said electrical heaters are adapted to be electromechanically coupled to a non-rotatable external power supply.

27. A temperature control apparatus as in claim 26 wherein said first and second optical generating means and said first and second optical receiving means are synchronized through the use of a common synchronization signal.

28. A temperature control apparatus as in claim 27 wherein said common synchronization signal is derived from said external power supply.

29. A temperature control apparatus as in claim 28 wherein said first optical signals comprise and series of synchronization bits followed by a combination of data bits and further synchronization bits.

30. A temperature control apparatus as in claim 29 wherein said second optical signals are frequency modulated to be indicative of said temperature of said cylindrical drum.

31. A temperature controlled, electrically heated drum, comprising:

a cylindrical drum having a surface and being rotatable on an axis;

an electrical heater thermally coupled to said surface of said cylindrical drum;

temperature control means, rotatably mounted in conjunction with said cylindrical drum and electrically coupled to said electrical heater, for controlling the temperature by controlling the flow of electricity to said electrical heater in response to control signals;

a temperature sensor thermally coupled to said surface of said cylindrical drum;

temperature sensor means, rotatably mounted in conjunction with said cylindrical drum and electrically coupled to said temperature sensor, for sensing the temperature of said surface of said cylindrical drum and producing temperature signals indicative thereof;

interface means, non-rotatably mounted with respect to said cylindrical drum, for providing interface to said temperature control means by generating said control signals; and optical means, coupled to said temperature control means, said temperature sensor means and said microprocessor means, for continuously aligning and optically coupling said temperature signals from said rotating temperature sensor means to said non-rotating microprocessor means and for continuously optically coupling said control signals from said non-rotating microprocessor means to said rotating temperature control means;

said optical means being mounted on said axis providing on-axis optical communication.

32. A temperature control apparatus as in claim 31 wherein said electrical heaters are adapted to be electromechanically coupled to a non-rotatable external power supply.

33. A temperature control apparatus as in claim 32 wherein said first and second optical generating means and said first and second optical receiving means are synchronized through the use of a common synchronization signal.

34. A temperature control apparatus as in claim 33 wherein said common synchronization signal is derived from said external power supply.

35. A temperature control apparatus as in claim 34 wherein said first optical signals comprise and series of synchronization bits followed by a combination of data bits and further synchronization bits.

36. A temperature control apparatus as in claim 35 wherein said second optical signals are frequency modulated to be indicative of said temperature of said cylindrical drum.

37. A temperature controlled, electrically heated drum, comprising:

a cylindrical drum rotatable on an axis, said drum having an outer surface divided into a plurality of zones arranged longitudinally along said axis of said drum;

a plurality of electrical heaters, one for each of said plurality of zones, thermally coupled to each of said plurality of zones, respectively;

temperature control means, rotatably mounted in conjunction with said cylindrical drum and electrically coupled to said plurality of electrical heaters, for controlling the temperature by controlling the flow of electricity to said electrical heaters in response to control signals;

a plurality of temperature sensors, one for each of said plurality of zones, thermally coupled to each of said plurality of zones, respectively;

temperature sensor means, rotatably mounted in conjunction with said cylindrical drum and electrically coupled to said plurality of temperature sensors, for sensing the temperature of each of said plurality of zones of said surface of said cylindrical drum and producing temperature signals indicative thereof;

interface means, non-rotatably mounted with respect to said cylindrical drum, for providing interface to said temperature control means by providing said control signals; and optical means, coupled to said temperature control means, said temperature sensor means and said microprocessor means, for continuously aligning and optically coupling said temperature signals from said rotating temperature sensor means to said non-rotating microprocessor means and for continuously optically coupling said control signals from said non-rotating microprocessor means to said rotating temperature control means;

said optical means being mounted on said axis providing on-axis optical communication.

38. A temperature control apparatus as in claim 37 wherein said electrical heaters are adapted to be electromechanically coupled to a non-rotatable external power supply.

39. A temperature control apparatus as in claim 38 wherein said first and second optical generating means and said first and second optical receiving means are synchronized through the use of a common synchronization signal.

40. A temperature control apparatus as in claim 39 wherein said common synchronization signal is derived from said external power supply.

41. A temperature control apparatus as in claim 40 wherein said first optical signals comprise and series of synchronization bits followed by a combination of data bits and further synchronization bits.

42. A temperature control apparatus as in claim 41 wherein said second optical signals are frequency modulated to be indicative of said temperature of said cylindrical drum.

43. A temperature control apparatus adapted to control the temperature of a cylindrical drum rotatable on an axis, said drum having an outer surface divided into a plurality of zones arranged longitudinally along said axis, said cylindrical drum having a plurality of electrical heaters, one for each of said plurality of zones, thermally coupled to each of said plurality of zones, said cylindrical drum having a plurality of temperature sensors, one for each of said plurality of zones, thermally coupled to each of said plurality of zones, respectively, said temperature control apparatus comprising:

temperature control means, rotatably mounted in conjunction with said cylindrical drum and electrically coupled to said plurality of electrical heaters, for controlling the temperature by controlling the flow of electricity to said electrical heaters in response to control signals;

temperature sensor means, rotatably mounted in conjunction with said cylindrical drum and electrically coupled to said plurality of temperature sensors, for sensing the temperature of each of said plurality of zones of said surface of said cylindrical drum and producing temperature signals indicative thereof;

interface means, non-rotatably mounted with respect to said cylindrical drum, for providing interface to said temperature control means by generating said control signals; and optical means, coupled to said temperature control means, said temperature sensor means and said microprocessor means, for continuously aligning and optically coupling said temperature signals from said rotating temperature sensor means to said non-rotating microprocessor means and for continuously optically coupling said control signals from said non-rotating microprocessor means to said rotating temperature control means;

said optical means being mounted on said axis providing on-axis optical communication.

44. A temperature control apparatus as in claim 43 wherein said electrical heaters are adapted to be electromechanically coupled to a non-rotatable external power supply.

45. A temperature control apparatus as in claim 44 wherein said first and second optical generating means and said first and second optical receiving means are synchronized through the use of a common synchronization signal.

46. A temperature control apparatus as in claim 45 wherein said common synchronization signal is derived from said external power supply.

47. A temperature control apparatus as in claim 46 wherein said first optical signals comprise and series of synchronization bits followed by a combination of data bits and further synchronization bits.

48. A temperature control apparatus as in claim 47 wherein said second optical signals are frequency modulated to be indicative of said temperature of said cylindrical drum.

49. A temperature control apparatus adapted to control the temperature of a movable object, said object having an electrical heater thermally coupled to said object and having a plurality of sensors operatively coupled to said object, said temperature control apparatus comprising:

temperature control means, movably mounted in conjunction with said object and electrically coupled to said electrical heater, for controlling the temperature of said object by controlling the flow of electricity to said electrical heater in response to a control signal;

sensor means, movably mounted in conjunction with said object and electrically coupled to said sensor, for sensing the status of said object and producing a status signal indicative thereof;

interface means, stationary with respect to said object, for providing interface to said temperature control means by generating said control signal; and optical means, coupled to said temperature control means, said temperature sensor means and said microprocessor means, for continuously aligning and optically coupling said temperature signals from said movable temperature sensor means to said stationary microprocessor means and for continuously optically coupling said control signal from said stationary microprocessor means to said movable temperature control means;

said optical means being mounted on said axis providing on-axis optical communication.

50. A temperature control apparatus as in claim 49 wherein said electrical heaters are adapted to be electromechanically coupled to a non-rotatable external power supply.

51. A temperature control apparatus as in claim 50 wherein said first and second optical generating means and said first and second optical receiving means are synchronized through the use of a common synchronization signal.

52. A temperature control apparatus as in claim 51 wherein said common synchronization signal is derived from said external power supply.

53. A temperature control apparatus as in claim 52 wherein said first optical signals comprise and series of synchronization bits followed by a combination of data bits and further synchronization bits.

54. A temperature control apparatus as in claim 53 wherein said second optical signals are frequency modulated to be indicative of said temperature of said cylindrical drum.

55. A temperature control apparatus adapted to control the temperature of a cylindrical drum rotatable on an axis, said drum having an outer surface divided into a plurality of zones arranged longitudinally along said axis, said cylindrical drum having a plurality of electrical heaters, one for each of said plurality of zones, thermally coupled to each of said plurality of zones, said cylindrical drum having a plurality of temperature sensors, one for each of said plurality of zones, thermally coupled to each of said plurality of zones, respectively, said temperature control apparatus comprising:

temperature control means, rotatably mounted in conjunction with said cylindrical drum and electrically coupled to said plurality of electrical heaters, for controlling the temperature by controlling the flow of electricity to said electrical heaters in response to drum control signals;

temperature sensor means, rotatably mounted in conjunction with said cylindrical drum and electrically coupled to said plurality of temperature sensors, for sensing the temperature of each of said plurality of zones of said surface of said cylindrical drum and producing drum temperature signals indicative thereof;

interface means, non-rotatably mounted witch respect to said cylindrical drum, for providing interface to said temperature control means by generating said interface control signals; and first optical generating means, non-rotatably mounted on said axis of said cylindrical drum, for receiving said interface control signals and generating first optical signals in response thereto;

first optical receiving means, rotatably mounted near said axis of said cylindrical drum, for continuously receiving said first digitally modulated optical signals and converting said first optical signals to said drum control signals;

second optical generating means, rotatably mounted on said axis of said cylindrical drum, for receiving said drum temperature signals and generating second optical signals in response thereto;

second optical receiving means, non-rotatably mounted near said axis of said cylindrical drum, for continuously receiving said second digitally modulated optical signals and converting said second optical signals to said interface temperature signals.

56. A temperature control apparatus as in claim 55 wherein said electrical heaters are adapted to be electromechanically coupled to a non-rotatable external power supply.

57. A temperature control apparatus as in claim 56 wherein said first and second optical generating means and said first and second optical receiving means are synchronized through the use of a common synchronization signal.

58. A temperature control apparatus as in claim 57 wherein said common synchronization signal is derived from said external power supply.

59. A temperature control apparatus as in claim 58 wherein said first optical signals comprise and series of synchronization bits followed by a combination of data bits and further synchronization bits.

60. A temperature control apparatus as in claim 59 wherein said second optical signals are frequency modulated to be indicative of said temperature of said cylindrical drum.

* * * * *